United States Patent
Shirley, Jr. et al.

(10) Patent No.: US 11,358,909 B2
(45) Date of Patent: Jun. 14, 2022

(54) FERTILIZER CONTAINING A SEED GRIND AND A METHOD OF USING THE FERTILIZER TO ENHANCE PLANT GROWTH

(71) Applicant: Innovations for World Nutrition, LLC, Florence, AL (US)

(72) Inventors: Arthur R. Shirley, Jr., Florence, AL (US); Melissa C. Hayes, Florence, AL (US)

(73) Assignee: INNOVATIONS FOR WORLD NUTRITION, LLC, Florence, AL (US)

(*) Notice: Subject to any disclaimer, the term of this patent is extended or adjusted under 35 U.S.C. 154(b) by 0 days.

(21) Appl. No.: 17/517,074

(22) Filed: Nov. 2, 2021

(65) Prior Publication Data

US 2022/0055963 A1    Feb. 24, 2022

Related U.S. Application Data

(63) Continuation-in-part of application No. 17/227,566, filed on Apr. 12, 2021.

(60) Provisional application No. 63/010,087, filed on Apr. 15, 2020.

(51) Int. Cl.
```
C05G 5/12      (2020.01)
C05F 11/00     (2006.01)
C05C 3/00      (2006.01)
```
(52) U.S. Cl.
CPC .............. *C05G 5/12* (2020.02); *C05C 3/00* (2013.01); *C05F 11/00* (2013.01)

(58) Field of Classification Search
CPC .... C05G 5/12; C05G 5/14; C05C 3/00; C05F 11/00
See application file for complete search history.

(56) References Cited

U.S. PATENT DOCUMENTS

| | | |
|---|---|---|
| 1,870,131 A | 8/1932 | Meier |
| 3,197,302 A | 7/1965 | MacBride |
| 3,506,432 A | 4/1970 | Arita |
| 4,026,695 A | 5/1977 | Young |
| 4,559,076 A | 12/1985 | Young |
| 4,571,256 A | 2/1986 | Takagi |
| 5,044,117 A | 9/1991 | Kuckens |
| 5,308,373 A | 5/1994 | Moore |
| 5,338,551 A | 8/1994 | Lajoie |
| 5,432,148 A | 7/1995 | Winston |
| 5,443,835 A | 8/1995 | Winston |

(Continued)

FOREIGN PATENT DOCUMENTS

| | | |
|---|---|---|
| BR | 409658 | 4/1934 |
| BR | 1287749 | 6/1972 |

(Continued)

OTHER PUBLICATIONS

Dijkstra, J., et al. "Diet effects on urine composition of cattle and N2O emissions." Animal 7.s2 (2013): 292-302. (Year: 2013).*

(Continued)

*Primary Examiner* — Jennifer A Smith
(74) *Attorney, Agent, or Firm* — Jeffrey S. Melcher; Melcher Patent Law PLLC

(57) ABSTRACT

A fertilizer having a seed grind and a method of using the fertilizer to grow plants.

16 Claims, 1 Drawing Sheet

(56) References Cited

U.S. PATENT DOCUMENTS

| | | | |
|---|---|---|---|
| 5,468,715 | A | 11/1995 | Joseph |
| 5,741,521 | A | 4/1998 | Knight |
| 5,849,060 | A | 12/1998 | Diping |
| 5,876,990 | A | 3/1999 | Reddy |
| 6,101,763 | A | 8/2000 | Aoki |
| 6,231,633 | B1 | 5/2001 | Hirano |
| 6,358,294 | B1 | 3/2002 | Latting |
| 6,387,145 | B1 | 5/2002 | Miele |
| 6,475,257 | B1 | 11/2002 | Baptist |
| 7,487,892 | B1 | 2/2009 | Hirsch |
| 7,753,984 | B2 | 7/2010 | Liu |
| 7,776,124 | B2 | 8/2010 | Binder |
| 8,328,898 | B2 | 12/2012 | Liu |
| 8,609,145 | B2 | 12/2013 | Anderson |
| 8,883,677 | B2 | 11/2014 | Windhoevel |
| 8,940,074 | B2 | 1/2015 | Kuo |
| 8,979,970 | B2 | 3/2015 | Kucera |
| 9,174,885 | B2 | 11/2015 | Taulbee |
| 9,334,199 | B2 | 5/2016 | Kuo |
| 9,566,240 | B2 | 2/2017 | Burch |
| 9,682,894 | B2 | 6/2017 | Gabrielson |
| 10,986,769 | B2 | 3/2021 | Ochampaugh |
| 2003/0061758 | A1 | 4/2003 | Wilson |
| 2004/0200248 | A1 | 10/2004 | Kirkegaard |
| 2005/0246953 | A1 | 11/2005 | Wedegaertner |
| 2006/0003893 | A1 | 1/2006 | Pursell |
| 2006/0107589 | A1 | 5/2006 | Rubin |
| 2010/0034792 | A1 | 2/2010 | Becker |
| 2011/0113843 | A1 | 5/2011 | Mantelatto |
| 2011/0174032 | A1 | 7/2011 | Liu |
| 2012/0103039 | A1 | 5/2012 | Brucher |
| 2012/0190776 | A1 | 7/2012 | Houston |
| 2014/0069001 | A1 | 3/2014 | Rose |
| 2014/0106964 | A1 | 3/2014 | Jogikalmath |
| 2015/0305251 | A1 | 10/2015 | Eyres |
| 2016/0031763 | A1 | 2/2016 | Kim |
| 2016/0128294 | A1 | 5/2016 | Nordskog |
| 2016/0280613 | A1 | 9/2016 | Wickstrom |
| 2016/0332929 | A1 | 11/2016 | McKnight |
| 2017/0008812 | A1 | 1/2017 | Kim |
| 2017/0152195 | A1 | 6/2017 | Terenzio |
| 2017/0166488 | A1 | 6/2017 | Chaudhry |
| 2017/0354145 | A1 | 12/2017 | Rhodia |
| 2018/0103576 | A1 | 4/2018 | Luttrell |
| 2018/0251654 | A1 | 9/2018 | Chen |
| 2019/0185390 | A1 | 6/2019 | Shirley |
| 2020/0068785 | A1 | 5/2020 | Geiger |

FOREIGN PATENT DOCUMENTS

| | | | |
|---|---|---|---|
| CN | 1088562 | | 6/1994 |
| CN | 1089932 | | 7/1994 |
| CN | 1136028 | | 11/1996 |
| CN | 1141276 | | 1/1997 |
| CN | 1240777 | A | 1/2000 |
| CN | 1296934 | | 5/2001 |
| CN | 1400196 | A | 3/2003 |
| CN | 1408680 | A | 4/2003 |
| CN | 1122652 | | 10/2003 |
| CN | 1629107 | | 6/2005 |
| CN | 101157580 | | 4/2008 |
| CN | 101195547 | | 6/2008 |
| CN | 101781137 | | 7/2010 |
| CN | 102515911 | | 6/2012 |
| CN | 102584383 | A * | 7/2012 |
| CN | 10278356 | | 11/2012 |
| CN | 102936169 | | 2/2013 |
| CN | 102980959 | A * | 3/2013 |
| CN | 103304292 | | 9/2013 |
| CN | 103518456 | | 1/2014 |
| CN | 103539526 | | 1/2014 |
| CN | 103539556 | | 1/2014 |
| CN | 03570420 | | 2/2014 |
| CN | 03708891 | | 4/2014 |
| CN | 104045437 | | 9/2014 |
| CN | 104086268 | | 10/2014 |
| CN | 104262018 | | 1/2015 |
| CN | 104496685 | | 4/2015 |
| CN | 104557312 | | 4/2015 |
| CN | 104591818 | | 5/2015 |
| CN | 104829358 | | 8/2015 |
| CN | 104829362 | | 8/2015 |
| CN | 104973929 | A * | 10/2015 |
| CN | 105104060 | A * | 12/2015 |
| CN | 105347876 | | 2/2016 |
| CN | 105948892 | | 9/2016 |
| CN | 106316495 | | 1/2017 |
| CN | 106316532 | | 1/2017 |
| CN | 106576795 | | 4/2017 |
| CN | 106747771 | | 5/2017 |
| CN | 106818732 | | 6/2017 |
| CN | 107235814 | | 10/2017 |
| EP | 2716620 | | 9/2014 |
| FR | 1520587 | | 4/1968 |
| JP | 54130367 | | 10/1979 |
| JP | 5626796 | | 3/1981 |
| JP | H06105620 | | 4/1994 |
| WO | 9627288 | | 2/1996 |
| WO | 01/14285 | | 3/2001 |
| WO | 2009091570 | | 1/2009 |
| WO | 2014106424 | | 7/2014 |
| WO | 2017068038 | | 4/2017 |

OTHER PUBLICATIONS

"Anticaking agent." Wikipedia, Wikimedia Foundation, Nov. 5, 2011 <https://en.wikipedia.org/wiki/Anticaking_agent> (Year: 2011).*

Zahid, "A comprehensive review on biodegradable polymers and their blends used in controlled release fertilizer processes," Rev., Chem. Eng. 2015; 31(1) pp. 69-95.

Kissel, "Management of urea fertilizers," Kansas State University, 1988.

Cai, et al. "Nitrogen loss from ammonium bicarbonate and urea fertilizers applied to flooded rice," Fertilizer Research 10.3 (1986): 203-215.

Black, et al. "Effects of form of nitrogen, season, and urea application rate on ammonia volatilisation from pastures," New Zealand Journal of Agricultural Research 28.4 (1985): 469-474.

Yong Zhang, "An Eco-Friendly Slow-Release Urea Fertilizer Based on Waste Mulberry Branches for Potential Agriculture and Horticulture Applications," Sustainable Chem. Eng. 2014, 2, 7, 1871-1878.

Yangfang. "k-CarrageenanSodium Alginate Beads and Superabsorbent Coated Nitrogen Fertilizer with Slow-Release, Water-Retention, and Anticompaction Properties," Ind. Eng. Chem. Res., 2012, 51 (3), pp. 1413-1422.

Chen Lung-Yie, et al. "Effect of deep-application of prilled ammonium bicarbonate fertilizer on the nitrogen supplying status of non-calcareous paddy soils." Acta Pedologica Sinica, 15, 75-82 (1978).

Li, et al. "Ammonium bicarbonate used as a nitrogen fertilizer in China." Fertilizer Research (1980) 1: 125.

Savant et al. "Deep placement of urea supergranules in transplanted rice: Principles and practices." Fertilizer Research (1990) 25: 1.

Song, et al. "Study on fertilizer efficiency and its mechanism of urea and ammonium bicarbonate treated with controlled-release technology." Journal fo Plant Nutrition and Fertilizer, 2003, 9(1): 50-56.

Higuchi, et al. "Further evidence for gaseous $CO_2$ transport in relation to root uptake of $CO_2$ in rice plant, Soil Sciene, and Plant Nutrition." 1984, 30:2, 125-136.

Enoch, et al. "Plant response to irrigation with water enriched with carbon dioxide." New Phytologist, 1993,125: 249-258.

Stolwijk, et al. On the Uptake of Carbon Dioxide and Bicarbonate by Roots, and Its Influence on Growth. Plant Physiol. 1957;32(6):513-20.

Harris-Lovett. (Jul. 22, 2015) GMO rice could reduce greenhouse gas emissions, study says. Retrieved from http://www.latimes.com.

Ikeda, et al. (1992) Stimulation of dark carbon fixation in rice and tomato roots by application of ammonium nitrogen, Soil Science and Plant Nutrition, 38:2, 315-322.

(56) References Cited

OTHER PUBLICATIONS

Bergquist, (1964) Absorption of Carbon Dioxide by Plant Roots, Botaniska Notiser, 117:3, 249-261.
Allen, et al. (2005) Crop Responses to Elevated Carbon Dioxide and Interaction with Temperature, Journal of Crop Improvement, 13:1-2, 113-155.
Colmer, et al. (2006), Root aeration in rice (*Oryza sativa*): evaluation of oxygen, carbon dioxide, and ethylene as possible regulators of root acclimatizations. New Phytologist, 170: 767-778.
Wikipedia. "Soil Test." Version: Jun. 25, 2017. (Jun. 25, 2017) Retrieved: Feb. 8, 2019 (Feb. 8, 2019). wikipedia.org.
Livingston. "The Soil as Direct Source of Carbon Dioxide for Ordinary Plants" Plant physiology vol. 9,2 (1934): 237-59.
Leonard. "Effect of Various Oxygen and Carbon Dioxide Concentrations on Cotton Root Development" Plant Physiology Jan. 1946, 21 (1) 18-36.
Madhu. "Dynamics of Plant Root Growth Under Increased Atmospheric Carbon Dioxide" Agron. J. (2013) 105:657-669.
Lowe. "Carbon Dioxide Requirement for Growth of Legume Nodule Bacteria" Soil Science vol. 94, 6 (1962): 351-356.
Ma. "An inorganic CO2 diffusion and dissolution process explains negative CO2 fluxes in saline/alkaline soils" Sci. Rep. 3, 2025 (2013): 1-7.
Majeau. "Effect of CO2 Concentration on Carbonic Anhydrase and Ribulose-1,5-Biphosphate Carboxylase/Oxygenase Expression in Pea" Plant Physiol. vol. 112 (1996): 569-574.
Matocha. "Effects of carbon dioxide and iron enrichment of a calcareous soil on Fe-chlorosis, root and shoot development of grain sorghum." Journal of Plant Nutrition, vol. 11, 6-11 (1988): 1503-1515.
Mauney. "Responses of Glasshouse Grown Cotton to Irrigation with Carbon Dioxide-Saturated Water." Crop Sci. vol. 28, 5 (1088): 835-838.
Miller. "Carbon Dioxide-Bicarbonate Absorption, Accumulation, Effects on Various Plant Metabolic Reactions, and Possible Relations to Lime-Induced Chlorosis." Soil Sci. vol. 89, 5 (1960): 241-245.
Mingo-Castel. "Effect of Carbon Dioxide and Ethylene on Tuberization of Isolated Potato Stolons Cultured in Vitro." vol. 53 (1974) 798-801.
Shingo. The intake and utilization of carbon by plant roots from C14-labeled urea Part I. The determination of radioactive carbon of plant materials and a preliminary seedling experiment utilizing C14-labeled urea. Soil Sci. and Plant Nutrition vol. 3,1 (1957): 59-64.
Moore. "Potential for Irrigation with Carbon Dioxide." Acta Hortic. (1990). www.actahort.org.
Niu. "Effect of elevated CO2 on phosphorus nutrition of phosphate-deficient *Arabidopsis thaliana* (L.) Heynh under different nitrogen forms." Journal of Experimental Botany, vol. 64,1 (2013): 355-367.
Nobel. "Soil O2 and CO2 Effects on Root Respiration of Cacti." Plant and Soil. 120,2 (1989). 263-271.
Novero. "Field-grown tomato response to carbonated water application." Agronomy journal. vol. 83, 5 (1991): 911-916.
Noyes. "Root Variations Induced by Carbon Dioxide Gas Additions to Soil." Botanical Gazette. vol. 66, 4 (1918): 364-373.
Noyes. "Residual Effects of Carbon Dioxide Gas Additions to Soil on Roots of *Lactuca sativa*." Botanical Gazette. vol. 69,4 (1920): 332-336.
Noyes. "Effects of Saturating Dioxide." Science. vol. 40, 1039 (1914): 792.
Paliwal. "Effect of bicarbonate-rich irrigation waters on the growth, nutrient uptake and synthesis of proteins and carbohydrates in wheat." Plant Soil vol. 43, 1-3 (1975): 523-536.
Palmer. "Cytokinins and Tuber Initiation in the Potato *Solanum tuberosum* L." Nature. vol. 221 (1969): 279-280.
Mitsui. "On the utilization of carbon in fertilizers through rice roots under pot experimental condition." Soil Science and Plant Nutrition. vol. 8,6 (1962): 16-23.

Radford. "New Research Shows Tree Roots Regulate CO2, Keep Climate Stable." Version: Feb. 19, 2014. (Feb. 19, 2014) Retrieved: Jan. 25, 2016 (Jan. 25, 2016). ecowatch.com.
Ryan. "Effect of Surface-Applied Sulfuric Acid on Growth and Nutrient Availability of Five Range Grasses in Calcareous Soils." Journal of Range Management, vol. 28, 5 (1975): 411-414.
Skelding. "The Effect of Carbon Dioxide on the Absorption of Manganese by Root Tissues of Red Beet." Ann Bot. vol. 21, 1 (1957): 121-141.
Skok. "Upate of CO2 by roots of Xanthium plants." Bot. Gaz. 124 (1962): 118-120.
Stoter. "Radioactive Anomalies from Old CO2 in the Soil and Canopy Air." Radiocarbon. vol. 53, 1 (2011): 55-69.
Spittstoesser. "Dark CO2 Fixation and its Role in the Growth of Plant Tissue." Plant Physiol. 41, 5 (1966) 755-759.
Stemmet. "The Uptake of Carbon Dioxide by Plant Roots." Plant and Soil. vol. 17, 3 (1962): 357-364.
Storlie. "Soil, plant, and canopy responses to carbonated irrigation water." Hort. Technology. vol. 6, 2 (1996): 111-114.
Sun. "Effects of elevated CO2 Applied to Potato Roots on the Anatomy and Ultrastructure of Leaves." Biologia Plantarum vol. 55, 4 (2011): 675-680.
Unger. "Influence of Oxygen and Carbon Dioxide on Germination and Seedling Development of Corn (*Zea mays* L.)." Agronomy Journal. vol. 57, 1 (1965): 56-58.
Invitation issued in PCT/US/26983, dated Jul. 6, 2021, pp. 1-2.
Qiu, "Biostimulant Seed Coating Treatments to Improve Cover Crop Germination and Seedling Growth," Agronomy 2020, 10, 154; doi:10.3390/agronomy10020154, www.mdpi.com/journal/agronomy Received: Dec. 28, 2019; Accepted: Jan. 19, 2020; Published: Jan. 22, 2020, pp. 1-14.
Office Action issued in U.S. Appl. No. 17/227,596, dated Jul. 8, 2021, pp. 1-33.
Amirkhani, "Biostimulant Seed Coating Treatments to Improve Cover Crop Germination and Seedling Growth," agronomy 2020, 10, 154, www.mdpi.com/journal/agronomy, Jan. 22, 2020, pp. 1-14.
Written Opinion issued in PCT/US21/27093, dated Sep. 17, 2021, pp. 1-16.
Office Action issued in U.S. Appl. No. 17/227,566, dated Jun. 8, 2021, pp. 1-58.
Written Opinion issued in PCT/US21/26983, dated Sep. 1, 2021, pp. 1-43.
Breene et al. "Sucrose Esters: Their Impact on Soybean Oil Utilization" 1988, pp. 367-380, entire document especially Figure 1, Table 4, Figure 2.
Mad Barn. "Kelp Meal". <https://madbarn.com/feeds/kelp-meal/> Sep. 23, 2020 (Year: 2020).
Viktor. "The influence of root assimilated inorganic carbon on nitrogen acquisition/assimilation and carbon partitioning." New Phytol. 165, 1 (2005): 157-69.
Vuorinen. "Dark CO2 fixation by roots of willow and barley in media with a high level of inorganic carbon." Journal of Plant Physiology. vol. 151, 4 (1997): 405-408.
Hernandez. "Different Bacterial Populations Associated with the Roots and Rhizosphere of Rice Incorporate Plant-Derived Carbon." Appl Environ Microbiol. vol. 81 (2015): 2244-2253.
Bugbee. "CO2 crop growth enhancement and toxicity in wheat and rice." Adv. Space Res. vol. 14, 11 (1994): 257-267.
Razzaque. "Effects of Nitrogen Fertilizer and Elevated CO2 on Dry Matter Production and Yield of Rice Cultivars." Bangladesh J. Agril. Res. 34,2 (2009): 313-322.
Allen. "The CO2 fertilization effect: higher carbohydrate production and retention as biomass and seed yield." Global climate change and agricultural production. direct and indirect effects, Chapter 39. (1996).
Brix. "Uptake and photosynthetic utilization of sediment-derived carbon by Phragmites australis (Cav.) Trin. ex Steudel." Aquatic Botany. vol. 38, 4 (1990): 377-389.
Cannon. "On the Relation of Root Growth and Development to the Temperature and Aeration of the Soil." American Journal of Botany. vol. 2, 5 (1915): 211-224.
Chang. "Effect of Carbon Dioxide on Absorption of Water and Nutrients by Roots." Plant Physiol. vol. 20, 2 (1945): 221-232.

(56) References Cited

OTHER PUBLICATIONS

Cramer. "Inorganic carbon fixation and metabolism in maize roots as affected by nitrate and ammonium nutrition." Physiologia Plantarum. vol. 89, 3 (2006): 632-639.
Dilorio. "Carbon dioxide improves the growth of hairy roots cultured on solid medium and in nutrient mists." Applied Microbiology Biotechnology. vol. 37 (1992): 463-467.
Gorski. "1986: Response of eggplant solanum melogena to a root environment enriched with carbon dioxide." Hortsciencesect. vol. 1 (1986): 495-498.
Grinfield. "On the Nutrition of Plants with Carbon Dioxide through the Roots." Physiology of Plants. vol. 97, 5 (1954).
Jin. "Elevated Carbon Dioxide Improves Plant Iron Nutrition through Enhancing the Iron-Deficiency-Induced Responses under Iron-Limited Conditions in Tomato." Plant Physiology. vol. 150 (2009): 272-280.
Written Opinon and International Search Report issued in corresponding PCT/US18/65373, dated Feb. 27, 2018, pp. 1-41.
Prior art search conducted Jan. 4, 2018, PatPro Inc., Taun Nguyen, pp. 1-7.
Subbaiah, S.V., et al. "Studies on yield maximization through balanced nutrient ratios in irrigated lowland rice." International Rice Commission Newsletter (FAO), 50 (2001): 59-65.
Demand for Chapter II and Response to Written Opinion filed in corresponding PCT/US18/65373, filed May 15, 2019, pp. 1-34.
International Preliminary Report on Patentability issued in PCT/US18/065373, dated Aug. 27, 2019, pp. 1-13.

* cited by examiner

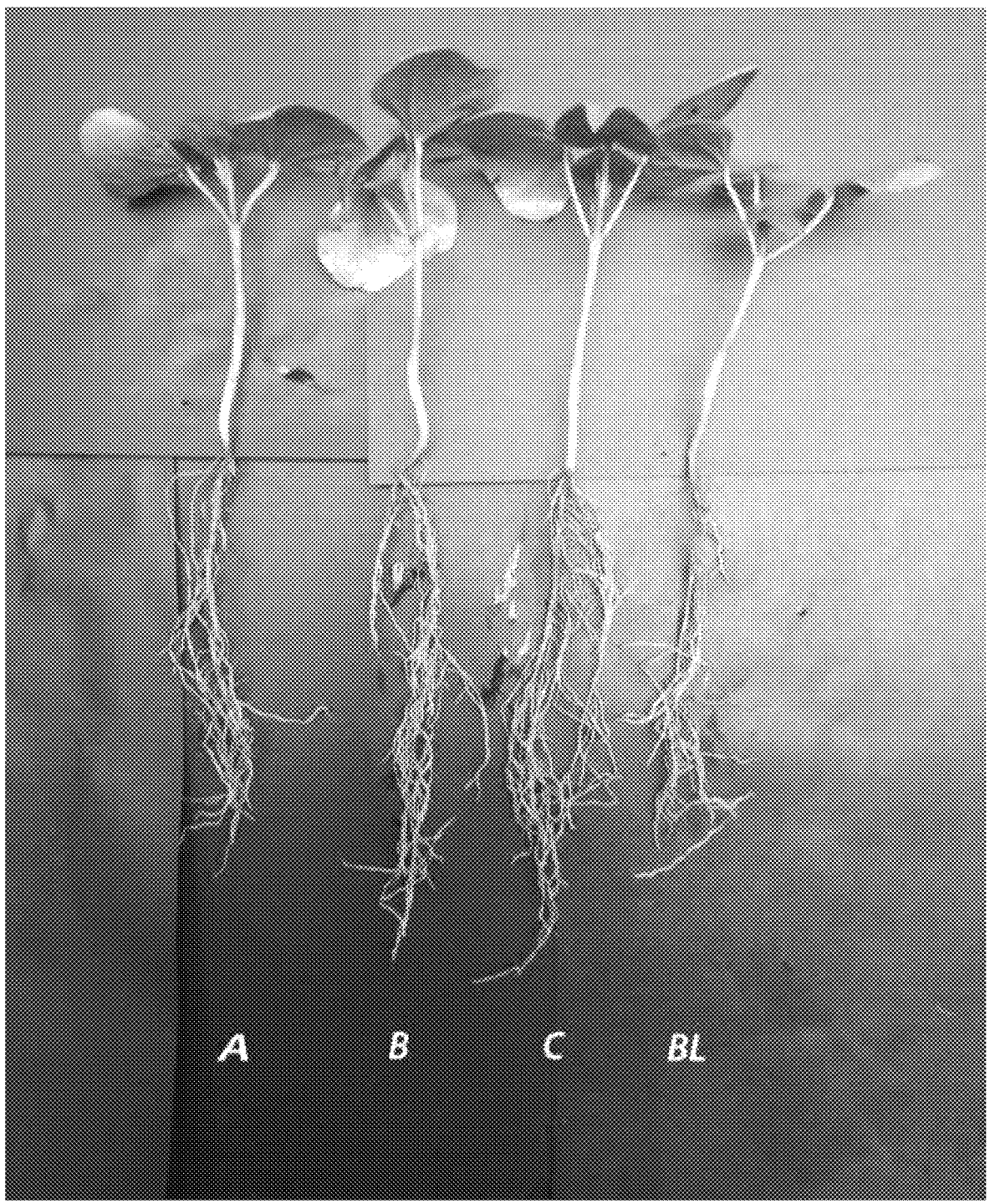

FERTILIZER CONTAINING A SEED GRIND AND A METHOD OF USING THE FERTILIZER TO ENHANCE PLANT GROWTH

FIELD OF THE INVENTION

The invention relates to fertilizer formed from a seed grind which can further include a source of sugar, a source of bicarbonate and a source of fertilizer nutrients to enhance the growth rate and yield of plants. The invention also relates to a method enhancing the growth of plants using the fertilizer.

BACKGROUND OF THE INVENTION

Due to rising populations around the world and limited arable land for growing food, finding ways to improve food production is a serious concern. It is well known that plants need energy, nitrogen, phosphorus, potassium, secondary nutrients, micronutrients, water and carbon or carbon dioxide to grow.

It is typically accepted that plants obtain carbon for growth from carbon dioxide in surrounding air through stomata in their leaves. However, the amount of carbon dioxide in air is extremely low (currently about 355 ppm). Carbon is a limiting nutrient in plant growth, and thus finding other ways to supply carbon dioxide to plants have been investigated for years. It is well known that supplying gaseous $CO_2$ to plant leaves increases yield and is a common practice for greenhouse horticulture.

SUMMARY OF THE INVENTION

An objective is to provide a novel fertilizer for increasing plant crop yield. A further objective is to provide a novel plant growth promoter for increasing plant crop yield.

When a plant seed first sprouts to form a small seedling, the only carbon, nutrients, and energy available for growth are stored in the seed. Stored within the seed is all that the seedling needs to grow until it can form its roots and to produce leaves. Initially, the roots form and then the leaves. The leaves of the small seedling have very little surface area, and photosynthesis is limited to the amount of energy the leaves can absorb as well as carbon that the leaves and roots can make available to build new plant cells. For this reason, for early growth the seedling uses the carbon and energy stored in the seed as well as nutrients in the seed. If a plant gets a head start by having available additional seed components in combination with sufficient additional fertilizer nutrients, then the seedling more efficiently takes up nutrients and can produce more growth through photosynthesis. The head start allows the plant to outcompete other plants and weeds and to put on growth before pests such as insects and molds have had a chance to multiply. As a result, plants with an early advantage are healthier and go on to produce greater yields.

The invention includes a fertilizer comprising a seed grind, a source of sugar, a source of bicarbonate, and a source of fertilizer nutrients used to produce increased plant growth, increased yields in crops, improve efficiency of nitrogen uptake by plants, and increase plant uptake of carbon.

The invention further includes a fertilizer comprising a seed grind, a source of sugar, and a source of fertilizer nutrients used to produce increased plant growth, increased yields in crops, improve efficiency of nitrogen uptake by plants, and increase plant uptake of carbon.

The invention further includes a fertilizer comprising a seed grind, a source of bicarbonate, and a source of fertilizer nutrients used to produce increased plant growth, increased yields in crops, improve efficiency of nitrogen uptake by plants, and increase plant uptake of carbon.

The invention further includes a fertilizer comprising a seed grind, and a source of fertilizer nutrients used to produce increased plant growth, increased yields in crops, improve efficiency of nitrogen uptake by plants, and increase plant uptake of carbon.

The invention further includes a plant growth promoter comprising a seed grind, a source of sugar, and a source of bicarbonate.

The invention further includes a plant growth promoter comprising a seed grind and a source of sugar.

The invention further includes a plant growth promoter comprising a seed grind and a source of bicarbonate.

The invention further includes a plant growth promoter comprising a seed grind.

Objectives of the invention and other objectives can be obtained by a method of enhancing the early growth of plants comprising applying a seed grind to a seed or seedling of a plant grown from the seed in an amount to enhance growth of the seedling, wherein the seed grind is applied to the soil or hydroponic medium of the seed in an amount from 20 grams (g) of the seed grind per kilogram (kg) of the seed to 100,000 g of the seed grind per kg of the seed.

Objectives of the invention and other objectives can also be obtained by a method of enhancing the early growth of plants comprising applying a seed grind to a seed or seedling of a plant grown from the seed in an amount to enhance growth of the seedling, wherein the seed grind is formed from a ground whole seed and the seed grind is applied to the soil or hydroponic medium of the seed in an amount from 20 grams (g) of the seed grind per kilogram (kg) of the seed to 100,000 g of the seed grind per kg of the seed, and wherein a source of bicarbonate is applied to the soil or hydroponic medium of the seed in an amount from 500 g of the source of bicarbonate per kg of the seed to 150,000 g of the source of bicarbonate per kg of the seed.

Objectives of the invention and other objectives can also be obtained by a method of enhancing the early growth of plants comprising applying a seed grind to a seed or seedling of a plant grown from the seed in an amount to enhance growth of the seedling, wherein the seed grind is formed from a ground whole seed and the seed grind is applied to the soil or hydroponic medium of the seed in an amount from 20 grams (g) of the seed grind per kilogram (kg) of the seed to 100,000 g of the seed grind per kg of the seed, and wherein a source of sugar is applied to the soil or hydroponic medium of the seed in an amount from 20 g of the source of sugar per kg of the seed to 100,000 g of the source of sugar per kg of the seed.

Objectives of the invention and other objectives can also be obtained by a method of enhancing the early growth of plants comprising applying a seed grind to a seed or seedling of a plant grown from the seed in an amount to enhance growth of the seedling, wherein the seed grind is applied to the soil or hydroponic medium of the seed in an amount from 1 kg of the seed grind per hectare to 1,000 kg of the seed grind per hectare.

Objectives of the invention and other objectives can also be obtained by a method of enhancing the early growth of plants comprising applying a seed grind to a seed or seedling of a plant grown from the seed in an amount to enhance growth of the seedling, wherein the seed grind is formed from a ground whole seed and the seed grind is applied to the soil or hydroponic medium of the seed in an amount from 1 kg of the seed grind per hectare to 1000 kg of the seed grind per hectare, and wherein a source of bicarbonate is applied to the soil or hydroponic medium of the seed in an amount from 20 kg of the source of bicarbonate hectare of the seed to 1500 kg of the source of bicarbonate per hectare.

Objectives of the invention and other objectives can also be obtained by a method of enhancing the early growth of plants comprising applying a seed grind to a seed or seedling of a plant grown from the seed in an amount to enhance growth of the seedling, wherein the seed grind is formed from a ground whole seed and the seed grind is applied to the soil or hydroponic medium of the seed in an amount from 1 kg of the seed grind per hectare to 1000 kg of the seed grind per hectare, and wherein a source of sugar is applied to the soil or hydroponic medium of the seed in an amount from 1 kg of the source of sugar per hectare to 1000 kg of the source of sugar per hectare.

Objectives of the invention and other objectives can also be obtained by a method of enhancing the early growth of plants comprising applying a seed grind to a seed or seedling of a plant grown from the seed in an amount to enhance growth of the seedling, wherein the seed grind is formed from a ground whole seed and the seed grind is applied to the soil or hydroponic medium of the seed in an amount from 20 grams (g) of the seed grind per kilogram (kg) of the seed to 100,000 g of the seed grind per kg of the seed, and wherein ammonium bicarbonate is applied to the soil or hydroponic medium of the seed in an amount from 100 g of ammonium bicarbonate per kg of the seed to 200,000 g ammonium bicarbonate per kg of the seed, and at least one of an alkali bicarbonate selected from the group sodium bicarbonate and potassium bicarbonate is applied to the soil or hydroponic medium of the seed in an amount from 100 g of the alkali bicarbonate per kg of the seed to 200,000 g of the alkali bicarbonate per kg of the seed, and wherein urea is applied to the soil or hydroponic medium of the seed in an amount from 100 g of urea per kg of the seed to 100,000 g urea per kg of the seed.

BRIEF DESCRIPTION OF THE DRAWINGS

FIG. 1 is a photograph comparing cotton plants and roots grown in Example 2.

DETAILED DESCRIPTION OF THE INVENTION

Without being bound by any theory, the inventors believe that the present invention provides a complete package of energy, carbon, proteins, nutrients, secondary nutrients, and micro nutrients in the form of a seed grind. In addition, the present invention includes a source of carbon dioxide for plant uptake through the roots in the form of bicarbonate and well as readily available additional energy and carbon in the form of sugar. This combination of ingredients is specially balanced to give the plant what it needs for early growth that provides an unexpected increase in plant growth and crop yield.

Without being bound by any theory, the inventors believe the inventive fertilizer enhances early root growth of plants and early plant growth as will be shown by our examples.

A seed grind is ground seed. For this invention, seed is comprised of one of the following: whole seed or whole seed without a seed coating. For rice, the whole seed is comprised of a hull (seed coating) as well as bran surrounding an endosperm and a germ and is referred to as rough rice. For rice, if the hull is removed the seed is brown rice. If the bran is removed, the seed is white rice. Cereal crops have bran surrounding the seed and when ground the resulting seed grind is referred to as whole grain seed grind or brown seed grind.

Seed grind can include seed that is not clean or pure and may not be considered safe for human consumption since the seed grind is used in the invention for the growth of plants. Seed grind can include other ingredients such as one or more of the group comprising additional plant parts, dirt and/or other contaminants, molds, fungi, dispersing agents, parting agents, binders (adherents), bacteria, herbicides, pesticides, fungicides, and/or stabilizers, and/or other contaminants or additives. This seed grind does not require the use of seed that has been cleaned to levels for human consumption.

Without being bound by any theory, the inventors believe that using a seed grind formed from ground up seeds increases the available seed ingredients used to grow the initial roots from a seed, which greatly enhances the initial root and plant growth. The early growth of roots is far more beneficial than enhancement of plant growth later in the growing cycle. For example, plants having enhanced early root growth stay ahead of other plants not having enhanced early root growth throughout the entire growing season. Preferably, the seed grind is formed from the same type of seed to be grown. For example, for growing rice seed, ground up rice seeds (seed grind) is preferably used to enhance the early growth of roots from the seed. However, other types of seed grind (non-rice seeds) can be used as an enhancer for rice. Likewise, for example, brown rice seed grind (non-cotton seeds) has been found to be effective at enhancing the early growth of roots and plants from cotton seeds, corn seeds, and wheat seeds.

Seed grind contains many benefits for plants. For example, Table 1 shows a comparison of energy and nutrients of various seeds, according to USDA Nutrient Database (https://fdc.nal.usda.gov/).

TABLE 1

| | Nutritional Value per 100 g | | | | |
| --- | --- | --- | --- | --- | --- |
| | Brown Rice | White Rice | Whole Wheat | Corn Meal (Corn Seed Grind) | Corn Starch |
| Energy | 370 kcal | 370 kcal | 332 kcal | 361 kcal | 375 kcal |
| Carbohydrates | 77.24 g | 81.68 g | 74.48 g | 76.85 g | 87.5 |
| Sugars | 0.85 g | Not reported | 1.02 g | 0.64 g | 0 |
| Dietary Fiber | 3.52 g | 2.8 g | 13.1 g | 7.3 g | 0 |
| Fat | 2.92 g | 0.55 g | 1.95 g | 3.86 g | 0 |
| Protein | 7.82 g | 6.81 g | 9.61 g | 6.93 g | 0 |

TABLE 1-continued

Nutritional Value per 100 g

|  | Brown Rice | White Rice | Whole Wheat | Corn Meal (Corn Seed Grind) | Corn Starch |
|---|---|---|---|---|---|
| Calcium | 23 mg | 11 mg | 33 mg | 7 mg | 0 |
| Iron | 1.47 mg | 1.6 mg | 3.71 mg | 2.38 mg | 0 |
| Magnesium | 143 mg | 23 mg | 117 mg | 93 mg | 0 |
| Phosphorus | 333 mg | 71 mg | 323 mg | 272 mg | 0 |
| Potassium | 223 mg | 77 mg | 394 mg | 315 mg | 0 |
| Selenium | 23.4 µg | 15.1 µg | 12.7 µg | 15.4 µg | 0 |
| Sodium | 7 mg | 7 mg | 3 mg | 5 mg | 0 |
| Zinc | 2.02 mg | 1.2 mg | 2.96 mg | 1.73 mg | 0 |

Brown rice also contains many vitamins. As can be seen from Table 1, brown rice contains energy including carbohydrates and sugars as well as nutrients that are beneficial to plant growth. Brown rice seed grind contains more than white rice seed grind. Similarly, corn meal (corn seed grind) contains nutrients not found in corn starch.

Thus, seed grind including the whole seed provides more benefit to the growth of plants than seed grind that includes only seed without the hull, coating, and/or bran. Thus, a preferred seed grind of the invention includes seed grind comprising one or more of the group of rough rice seed grind, brown rice seed grind, whole wheat seed grind, wheat seed grind that includes the hull, corn seed grind, and/or other whole grains and/or whole grains with hulls.

Based on the chemical formula for corn starch, the percent carbon present in corn starch is 46.8%. According to Xue, the carbon in rice grain is 53-64% (Xue, W-ei, "Evaluation of biophysical factors driving temporal variations in carbon gain, water use and yield production in rice," Thesis, Lanzhou University, January 2015).

The inventive fertilizer can be in solid, semi-solid, or liquid form as desired for the particular application and/or plant. The plant can be grown in soil or hydroponically.

For the inventive fertilizer, the source of fertilizer nutrients can be any combination of conventional fertilizers. Although seed grinds also provide fertilizer nutrients, the use of the term "source of fertilizer nutrients" for the components of this invention does not include seed grind. Seed grind provides fertilizer nutrients and is included in the invention. Preferred sources of fertilizer nutrients include but are not limited to urea, ammonium bicarbonate, ammonium sulfate, ammonium nitrate, monoammonium phosphate (MAP), diammonium phosphate (DAP), urea ammonium nitrate (UAN), triple super phosphate, single super phosphate, potassium chloride, potassium bicarbonate, potassium sulfate, calcium ammonium nitrate, sulfate of potash magnesia, elemental sulfur, calcium carbonate (limestone), dolomite, gypsum, shell, marl, iron sulfate, iron oxides, chelated iron, iron nitrate, zinc sulfate, zinc oxide, chelated zinc, zinc-oxysulfate, zinc carbonate, copper oxide, copper sulfate, copper nitrate, magnesium nitrate, magnesium sulfate, magnesium oxide, sodium borate, boric acid, chelated manganese EDTA, calcium sulfate, calcium nitrate, calcium oxide, magnesium carbonate, selenium sulfate, selenium oxide, sodium tetraborate decahydrate (borax), sodium tetraborate pentahydrate, sodium tetraborate-pentaborate, colemanite, boric acid, ammonium molybdate, sodium molybdate, sodium bicarbonate, molybdic oxide, and/or manganese sulfate or any combination of these.

Urea is provided as a preferable source of nitrogen for a plant since urea reacts in the soil to form carbon dioxide and ammonia. This release of carbon dioxide is an provides the young plant with additional carbon dioxide that can be used by the plant to grow before the leaves of the plant are large enough to efficiently take up carbon dioxide.

The invention may also include a source of bicarbonate. The source of bicarbonate comprising at least one source of bicarbonate selected from the group ammonium bicarbonate, potassium bicarbonate and sodium bicarbonate. Preferably, the source of bicarbonate can be at least one of the alkali bicarbonates.

The invention further can include one or more source of sugar selected from the group comprising sucrose, powdered sugar, corn syrup, cane syrup, agave, sorghum, honey, sugar cane, sugar beets, fruits, and vegetables.

The combination of ingredients of the invention provides a measurable synergism demonstrated an unexpected increase in crop yield, improved efficiency of nitrogen uptake by the plant, and increased plant uptake of carbon dioxide.

The invention further can include one or more carbohydrate. The carbohydrate can include starches, sugars, and cellulose. Carbohydrates can be provided from plant parts, animal parts, or fungi. Sources of carbohydrates can be selected from the group comprising additional ground seed of any type (any plant, whole or not whole seed), ground plant roots, other ground plant parts, ground animal or animal parts, parts, ground fungi, and compounds that form or release carbohydrates when the coated seed is planted in soil. For example, potato, cassava, and sweet potato are sources of carbohydrates from plant roots and contain starch, sugar, and cellulose as well as many other compounds. Modified starches are sources of carbohydrates. Ground plant leaves and stems are sources of carbohydrates. Ground mealworm, insects, earthworms, grasshoppers, and crickets are just a few examples of animals or animal parts that can be sources of carbohydrates.

If soil tests show the soil to be deficient in one or more nutrients, then a starter fertilizer that comprises a small amount of nitrogen with other primary nutrients, secondary nutrients, and micronutrients at the levels indicated by the soil test can be applied. This starter fertilizer can be applied at, before, or just after planting and prior to, with, or as part of the inventive fertilizer.

Thus, the present invention can include methods of applying the present, inventive fertilizer and/or plant growth promoter, including a double application of fertilizers, i.e., the application of a starter fertilizer followed by the application of the present, inventive fertilizer and/or plant growth promoter, or applying the starter fertilizer and inventive fertilizer and/or plant growth promoter simultaneously, or applying the starter fertilizer contained within the inventive fertilizer. Furthermore, the present invention can include methods of applying the inventive fertilizer and/or plant growth enhancer that include multiple applications, i.e. an application of the inventive plant growth enhancer very early such as at planting the seed followed by later additional applications still very early in the plant growth when the plant most benefits.

Thus the invention includes methods of multiple applications of the inventive fertilizer and/or plant growth promoter wherein a first application of fertilizer or plant growth promoter can be applied when a seed is planted and at least one more application of fertilizer or plant growth promoter can be applied between 2 weeks and 8 weeks after the seed is planted. For all of these multiple applications, the invention can be applied when the seed is planted and again when the seedling is transplanted.

The fertilizer and/or plant growth promoter can be applied above or below the surface, as blends with each other, and/or blends with other common components conventionally blended with fertilizers, in any desired form, such as liquids, solids, semi-solids, powders, and dispersions.

The inventive fertilizer or plant growth promoter can be applied to the root zone of the plant by drilling to place the fertilizer beneath the soil surface. Alternatively, the fertilizer can be applied by side dressing, meaning applying the fertilizer to the surface of the soil at a distance of 1.27 cm to 15.2 cm (0.5 to 6 inches) away from the seed or in a trench 1.27 cm to 15.2 cm (0.5 to 6 inches) beside the row seed. Furthermore, the fertilizer may be applied by broadcasting across the soil surface. The fertilizer may be placed before, with, or after the seed is planted.

The inventive fertilizer can be applied as a solid, a powder, a suspension, or a slurry to the soil surface or beneath the soil surface. The fertilizer ideally works for crops such as rice, wild rice (genus: Zizania), sugar cane, water chestnuts, lotus, taro, water spinach, watercress, water celery, arrowroot, sago palm, nipa palm, marsh-type or fen grasses such as *Saccharum* hybrids, and other biomass crops such as bald cypress and eucalyptus grown under flooded or high moisture conditions. The inventive fertilizer can also be effective for growing all types of plants including but not limited to corn, cotton, wheat, soybeans, cassava, sugar beets, potatoes, sweet potatoes, yams, peanuts, energy grasses such as *Miscanthus, Pennisetum purpureum*, Switchgrass, and other prairie grasses or crops.

The inventive fertilizer and/or plant growth promoter can produce increased plant growth for all types of plants including but not limited to trees, bushes, ornamental plants, vegetables, fruits, vines, and more regardless of whether the plants are grown from seeds, rhizomes, tubers, roots, grafts, or any other method of starting plants. The inventive fertilizer and/or plant growth promoter can be especially beneficial to seedlings that are transplanted. For example, the invention can shorten the time for transplanted seedling to reach maturity after transplanting.

The inventive fertilizer and/or plant growth promoter preferably can be applied as a powder, package, granule, tablet or supergranule (very large granule made by rotary pellet machines in the same manner as range cubes) to the soil surface or beneath the soil surface.

The inventive fertilizer and/or plant growth promoter preferably can be applied early in the growth of the plant. Early means that the invention can be applied in the first half of the plant growth, preferably before 16 weeks, more preferably before 8 weeks, more preferably before 4 weeks, and most preferably at planting of the seed. The invention may also be placed when a seedling is planted.

An alternative form of the fertilizer and/or plant growth promoter can be as a package granule. The package granule comprises a water permeable, water soluble, or bio-degradable outside layer containing within the components of the inventive fertilizer and/or plant growth promoter. The contained components can be in the form of a solid, liquid, or slurry. When the package granule encounters water or soil moisture or the package biodegrades the components can start dissolving or dispersing.

Preferably, the form of the invention can be an agglomerated granule. The agglomerated granule may be formed as a compressed granule or as a pellet.

Preferably, a form of the invention can be a powder.

Plants can be grown using the inventive fertilizer or plant growth promoter, or combinations of both the inventive fertilizer and the plant growth promoter.

DETAILED DESCRIPTION OF THE INVENTION

It is well documented by agronomists that when a plant has a head start, it is a healthier and more productive plant. A set of tests is performed using a unique approach to observe early root growth without damaging the plants. This can be accomplished by planting seeds in cups of soil where the cup is transparent. This transparent cup is then placed inside an opaque cup. The seeds are planted in the soil against the inside surface of the transparent cup so that roots are checked simply by pulling the transparent cup out of the opaque cup and then replacing it when finished with the observation. The inventive fertilizer and/or plant growth promoter can be placed in the soil in the cup just before, with, or after the seed is planted. Preferably, the invention is placed in the soil in the cup when the seed is planted. The opaque cup protects the roots from light during growth. The roots can be viewed and pictures taken without disturbing the plants as they are developing and therefore a view of the early growth of the roots is possible. Seeing the early roots reveals how quickly they develop and allows them to be compared with roots for baseline tests and thereby shows the extreme benefits of early application of the invention even before significant plant leaves are formed. These observations and the yields obtained later for the plants that are transplanted from the cups demonstrates that early improved root development for the invention results in increased plant growth and increased yield. Even early in the plant growth, the improvements in the roots of the plants receiving the inventive fertilizer are dramatically evident to the observer. Without being bound by any theory, the inventors believe that this is because the plant's need for carbon dioxide and energy is supplied before the leaves of the plants can provide them.

For this description, improved nitrogen efficiency means that nitrogen loss from the fertilizer to the atmosphere is reduced; that nitrogen supplied by the fertilizer is available to the plant for a longer period of time; and that the plant takes up more nitrogen than is supplied by the fertilizer and/or plant growth promoter. Improved carbon uptake efficiency means that plants are able to utilize available carbon sources in the fertilizer, soil, and atmosphere more than plants grown under similar conditions with fertilizers supplying the same levels of primary nutrients (nitrogen, phosphorus, and potassium), secondary nutrients (sulfur, calcium, and magnesium), and the same level of micronutrients such as zinc, boron, iron, copper, manganese, molybdenum, and selenium. The plant utilization of carbon is measured as increased root mass, increased foliage mass, and when present, increased yield of plant product, such as for example grain.

For this description, crop yield refers to the weight of plant product per unit growing area, wherein the plant product is the part of the plant that is valuable as a commercial product, such as grain for example. Crop yield is typically expressed as kg/hectare, tonnes/hectare, bushels/acre, bushels/hectare or pounds/acre depending on the type of crop grown.

For this description, the amount of protein in the crop plant product refers to the weight percent of protein found in the crop plant product, such as grain for example. The protein level in the plant product can be quantified by measuring the weight % of nitrogen in the crop plant product.

For this description, biodegradable means that the material is capable of undergoing physical and biological decomposition such that at least 90% of the material ultimately decomposes into carbon dioxide ($CO_2$), biomass, and water in a maximum 48 months.

Unless otherwise stated in this description, all percent amounts are weight percent based on the total weight of the composition. For the components of the invention, the % compositions are calculated as weight percent of the total composition on a dry basis; or in other words, they are calculated as a percent of the total weight without added water. Thus, for suspensions, slurries and dispersions, the amount of the active ingredients can be determined before adding water and non-active ingredients such as fillers.

At planting and prior to or with the application of the present inventive fertilizer or the plant growth promoter, a starter fertilizer can be applied to the soil days before, at, or shortly after planting. This starter fertilizer comprises preferably up to 50.4 kg/hectare (45 pounds/acre) nitrogen, more preferably up to 44.8 kg/hectare (40 pounds/acre) nitrogen, more preferably 16.8-39.2 kg/hectare (15-35 pounds/acre), and most preferably 22.4-33.6 kg/hectare (20-30 pounds/acre) of starter nitrogen. In addition, the starter fertilizer can include other nutrients and micronutrients recommended based on the crop being grown and the soil test results on the soil used to grow the crop.

The starter fertilizer can comprise one or more of the following nutrients:
1) one or more nitrogen compounds selected from the group comprising urea, ammonia, ammonium nitrate, ammonium sulfate, calcium nitrate, diammonium phosphate (DAP), monoammonium phosphate (MAP), potassium nitrate, ammonium bicarbonate, urea-ammonium nitrate (UAN), potassium nitrate, and/or sodium nitrate;
2) one or more phosphorous compounds selected from the group comprising triple super phosphate, single super phosphate, diammonium phosphate, monoammonium phosphate, monopotassium phosphate, dipotassium phosphate, tetrapotassium pyrophosphate, and/or potassium metaphosphate;
3) one or more potassium compounds selected from the group comprising potassium chloride, potassium bicarbonate, potassium nitrate, potassium sulfate, monopotassium phosphate, dipotassium phosphate, tetrapotassium pyrophosphate, and/or potassium metaphosphate;
4) one or more secondary nutrients, and micronutrients sources selected from the group comprising elemental sulfur, calcium carbonate (limestone), dolomite, gypsum, shell, marl, iron sulfate, iron oxides, chelated iron, iron nitrate, zinc sulfate, zinc oxide, chelated zinc, zinc-oxysulfate, zinc carbonate, copper oxide, copper sulfate, copper nitrate, magnesium nitrate, magnesium sulfate, magnesium oxide, sodium borate, boric acid, chelated manganese EDTA, calcium sulfate, calcium nitrate, calcium oxide, magnesium carbonate, selenium sulfate and selenium oxide, sodium tetraborate decahydrate (borax), sodium tetraborate pentahydrate, sodium tetraborate-pentaborate, colemanite, boric acid, ammonium molybdate, sodium molybdate, molybdic oxide, sodium bicarbonate, and/or manganese sulfate, to name a few;
5) one or more liquid nutrient sources selected from the group comprising urea-ammonium nitrate (UAN), ammonia, bio slurries, and other slurries and suspensions; and
6) one or more organic nutrient sources selected from the group comprising manures, animal litters, and others.

For this invention, percent (%) bicarbonate is the weight percent of the bicarbonate ($HCO_3$) found within the source of bicarbonate. For example a bicarbonate source, ammonium bicarbonate, is 77.2% bicarbonate. Therefore, a composition of the invention made up of half seed grind and half ammonium bicarbonate can then be described as 50% seed grind and 38.6% bicarbonate.

For this invention, percent (%) fertilizer nutrient refers to the sum of the weight percent nitrogen and weight percent potassium within the source of fertilizer nutrient. For example, a source of fertilizer nutrient, urea, is 46% fertilizer nutrient. Therefore, a composition of the invention made up of half seed grind by weight and half urea by weight can be described as 50% seed grind and 23% fertilizer nutrient.

Further, ammonium bicarbonate is both a source of fertilizer nutrient (17.7% N) and a source of bicarbonate (77.2% bicarbonate). Thus a composition of the invention comprising 50% seed grind and 50% ammonium bicarbonate can be described as 50% seed grind, 38.6% bicarbonate, and 8.85% fertilizer nutrient.

An effective fertilizer of the invention comprises 1% to 99% seed grind, 0.2% to 97% source of sugar, 0.1% to 77% bicarbonate, and 0.1% to 60% fertilizer nutrient; more preferably from 10 wt. % to 89 wt. % seed grind, 1 wt. % to 70 wt. % source of sugar, 5 wt. % to 70 wt. % bicarbonate, and 5 wt. % to 50 wt. % of a source of fertilizer nutrient; and most preferably 20 wt. % to 78 wt. % seed grind, 2 wt. % to 60 wt. % source of sugar, 10 wt. % to 68 wt. % bicarbonate, and 10 wt. % to 50 wt. % of a source of fertilizer nutrient.

Another effective fertilizer of the invention comprises preferably at least 10 wt. % a seed grind, at least 10 wt. % a source of bicarbonate and at least 10 wt. % urea.

Another effective fertilizer of the invention comprises preferably at least 10 wt. % a seed grind, at least 10 wt. % ammonium bicarbonate, at least 10 wt. % of at least one of an alkali bicarbonate selected from the group sodium bicarbonate and ammonium bicarbonate, and at least 10 wt. % urea.

Another effective fertilizer of the invention comprises preferably at least 10 wt. % a seed grind, at least 10 wt. % a source of bicarbonate, at least 10 wt. % of a source of sugar, and at least 10 wt. % urea.

Another effective inventive fertilizer comprises preferably 1 wt. % to 99 wt. % seed grind, 0.2 wt. % to 98 wt. % source of sugar, and 0.2 wt. % to 60 wt. % of a source of fertilizer nutrient; more preferably 10 wt. % to 90 wt. % seed grind, 5 wt. % to 85 wt. % source of sugar, and 5 wt. % to 60 wt. % of a source of fertilizer nutrient; and most preferably 20 wt. % to 80 wt. % seed grind, 10 wt. % to 70 wt. % source of sugar, and 10 wt. % to 60 wt. % of a source of fertilizer.

Another effective inventive fertilizer comprises preferably 1 wt. % to 99 wt. % seed grind, 0.2 wt. % to 77 wt. % of a source of bicarbonate, and 0.2 wt. % to 60 wt. % of a source of fertilizer nutrient; more preferably 10 wt. % to 80 wt. % seed grind, 5 wt. % to 85 wt. % of a source of bicarbonate, and 5 wt. % to 60 wt. % of a source of fertilizer nutrient; and most preferably 20 wt. % to 80 wt. % seed grind, 10 wt. % to 70 wt. % of a source of bicarbonate, and 10 wt. % to 60 wt. % of a source of fertilizer nutrient.

An alternative inventive fertilizer comprises preferably 1 wt. % to 99 wt. % seed grind and 0.5 wt. % to 60 wt. % of a source of fertilizer nutrient; more preferably 10 wt. % to 95 wt. % seed grind and 5 wt. % to 60 wt. % of a source of fertilizer nutrient; and most preferably 20 wt. % to 90 wt. % seed grind and 10 wt. % to 60 wt. % of a source of fertilizer nutrient.

Another effective fertilizer of the invention can be comprised of preferably 1 wt. % to 98 wt. % seed grind, 1 wt. % to 77 wt. % of a source of bicarbonate, and 1 wt. % to 90 wt. % urea; more preferably 10 wt. % to 85 wt. % seed grind, 10 wt. % to 85 wt. % of a source of bicarbonate, and 5 wt. % to 80 wt. % urea; and most preferably 20 wt. % to 70 wt. % seed grind, 20 wt. % to 70 wt. % of a source of bicarbonate, and 10 wt. % to 60 wt. % urea.

Another effective fertilizer of the invention can be comprised of preferably 1 wt. % to 97 wt. % seed grind, 1 wt. % to 77 wt. % of ammonium bicarbonate, 1 wt. % to 77 wt. % of at least one of a alkali bicarbonate selected from the group sodium bicarbonate and potassium bicarbonate, and 1 wt. % to 90 wt. % urea; more preferably 10 wt. % to 78 wt. % seed grind, 10 wt. % to 77 wt. % of ammonium bicarbonate, 10 wt. % to 77 wt. % of at least one of a alkali bicarbonate selected from the group sodium bicarbonate and potassium bicarbonate and 2 wt. % to 70 wt. % urea; and most preferably 15 wt. % to 60 wt. % seed grind, 15 wt. % to 60 wt. % of ammonium bicarbonate, 15 wt. % to 60 wt. % of at least one of a alkali bicarbonate selected from the group sodium bicarbonate and potassium bicarbonate, and 10 wt. % to 55 wt. % urea.

Another effective fertilizer of the invention can be comprised of preferably 1 wt. % to 96 wt. % seed grind, 1 wt. % to 77 wt. % of ammonium bicarbonate, 1 wt. % to 77 wt. % of at least one of an alkali bicarbonate selected from the group sodium bicarbonate and potassium bicarbonate, 1 wt. % to 77 wt. % of a source of sugar, and 1 wt. % to 90 wt. % urea; more preferably 10 wt. % to 76 wt. % seed grind, 10 wt. % to 76 wt. % of ammonium bicarbonate, 10 wt. % to 76 wt. % of at least one of an alkali bicarbonate selected from the group sodium bicarbonate and potassium bicarbonate, 2 wt. % to 68 wt. % of a source of sugar, and 2 wt. % to 68 wt. % urea; and most preferably 20 wt. % to 60 wt. % seed grind, 15 wt. % to 55 wt. % of ammonium bicarbonate, 15 wt. % to 55 wt. % of at least one of an alkali bicarbonate selected from the group sodium bicarbonate and potassium bicarbonate, 5 wt. % to 45 wt. % of a source of sugar, and 5 wt. % to 45 wt. % urea.

An effective plant growth promoter of the invention can be comprised of preferably 1 wt. % to 99 wt. % seed grind, 0.5 wt. % to 98 wt. % source of sugar, and 0.2 wt. % to 77 wt. % of a source of bicarbonate; more preferably 10 wt. % to 90 wt. % seed grind, 5 wt. % to 85 wt. % source of sugar, and 5 wt. % to 70 wt. % of a source of bicarbonate; and most preferably 20 wt. % to 80 wt. % seed grind, 10 wt. % to 70 wt. % source of sugar, and 10 wt. % to 70 wt. % of a source of bicarbonate.

Another effective plant growth promoter of the invention can be comprised of preferably 1 wt. % to 99 wt. % seed grind and 1 wt. % to 99 wt. % source of sugar; more preferably 10 wt. % to 95 wt. % seed grind and 5 wt. % to 85 wt. % source of sugar; and most preferably 20 wt. % to 90 wt. % seed grind and 10 wt. % to 80 wt. % source of sugar.

Another effective plant growth promoter of the invention can be comprised of preferably 1 wt. % to 99 wt. % seed grind and 1 wt. % to 77 wt. % of a source of bicarbonate; more preferably 10 wt. % to 95 wt. % seed grind and 5 wt. % to 77 wt. % of a source of bicarbonate; and most preferably 20 wt. % to 90 wt. % seed grind and 10 wt. % to 77 wt. % of a source of bicarbonate.

Another effective plant growth promoter of the invention can be comprised of 0.5% to 100% seed grind, preferably 1% to 100% seed grind, and more preferably 5% to 100% seed grind.

Another effective fertilizer of the invention can be comprised of preferably 10 wt. % to 99 wt. % seed grind and 1 wt. % to 90 wt. % urea; more preferably 20 wt. % to 95 wt. % seed grind and 5 wt. % to 80 wt. % urea; and most preferably 30 wt. % to 90 wt. % seed grind and 10 wt. % to 70 wt. % urea.

Agronomists and farmers typically plan fertilizer applications for growing crops based on land area (acres or hectares) and usually not on the weight of the seed planted since the weight and number of seed per acre is not only crop specific but crop variety specific as well. For example, rice seed weighs much less per seed than cotton seed. Also, the number of seeds planted per acre for rice and cotton vary significantly. Some varieties of cotton have average seed weights that vary significantly. Each variety of a crop has its own ideal nutrient needs. Thus ranges for preferred applications vary significantly if described by seed weight. The preferred application rates of the invention are described as g/kg of seed and as weight per land area.

In one embodiment of the invention, a seed grind is applied to the soil or hydroponic medium of a seed or seedling of a plant grown from a seed in an amount of at least 20 grams (g) of the seed grind per kilogram (kg) of the seed; more preferably at least 100 g of the seed grind per kg of the seed; and most preferably at least 200 g of the seed grind per kg of the seed.

In one embodiment of the invention, a seed grind is applied to the soil or hydroponic medium of a seed or seedling of a plant grown from a seed in an amount preferably from 20 grams (g) of the seed grind per kilogram (kg) of the seed to 100,000 g of the seed grind per kg of the seed; more preferably from 100 g of the seed grind per kg of the seed to 75,000 g of the seed grind per kg of the seed; and most preferably from 200 g of the seed grind per kg of the seed to 50,000 g of the seed grind per kg of the seed. The seed grind may be applied before, with, or after the seed or seedling is planted. The seed grind may optionally be applied as a split application with a portion applied before or when the seed or seedling is planted and the remaining amount applied later.

In another embodiment of the invention, a seed grind and a source of bicarbonate are applied to the soil or hydroponic medium of a seed or seedling of a plant grown from a seed in an amount preferably from 20 g of the seed grind and 100 g of a source of bicarbonate per kg of the seed to 100,000 g of the seed grind and 200,000 g of a source of bicarbonate per kg of the seed; more preferably from 100 g of the seed grind and 500 g of a source of bicarbonate per kg of the seed to 75,000 g of the seed grind and 150,000 g of a source of bicarbonate per kg of the seed; and most preferably from 200 g of the seed grind and 1000 g of a source of bicarbonate per kg of the seed to 50,000 g of the seed grind and 110,000 g of a source of bicarbonate per kg of the seed. The seed grind and the source of bicarbonate may be applied before, with, or after the seed or seedling is planted. The seed grind and the source of bicarbonate may optionally be applied as a split application with a portion applied before or when the seed or seedling is planted and the remaining amount applied later.

In another embodiment of the invention, a seed grind and ammonium bicarbonate are applied to the soil or hydroponic medium of a seed or seeding of a plant grown from a seed in an amount preferably from 20 g of the seed grind and 100 g of ammonium bicarbonate per kg of the seed to 100,000 g of the seed grind and 200,000 g of ammonium bicarbonate per kg of the seed; more preferably from 100 g of the seed grind and 500 g of ammonium bicarbonate per kg of the seed to 75,000 g of the seed grind and 150,000 g of ammonium bicarbonate per kg of the seed; and most preferably from 200 g of the seed grind and 1000 g of ammonium bicarbonate per kg of the seed to 50,000 g of the seed grind and 110,000 g of ammonium bicarbonate per kg of the seed. The seed grind and ammonium bicarbonate may be applied before, with, or after the seed or seedling is planted. The seed grind and ammonium bicarbonate may optionally be applied as a split application with a portion applied before or when the seed or seedling is planted and the remaining amount applied later.

In another embodiment of the invention, a seed grind and sodium bicarbonate are applied to the soil or hydroponic medium of a seed or seeding of a plant grown from a seed in an amount preferably from 20 g of the seed grind and 100 g sodium bicarbonate per kg of the seed to 100,000 g of the seed grind and 200,000 g sodium bicarbonate per kg of the seed; more preferably from 100 g of the seed grind and 500 g sodium bicarbonate per kg of the seed to 75,000 g of the seed grind and 150,000 g sodium bicarbonate per kg of the seed; and most preferably from 200 g of the seed grind and 1000 g sodium bicarbonate per kg of the seed to 50,000 g of the seed grind and 110,000 g sodium bicarbonate per kg of the seed. The seed grind and sodium bicarbonate may be applied before, with, or after the seed or seedling is planted. The seed grind and sodium bicarbonate may optionally be applied as a split application with a portion applied before or when the seed or seedling is planted and the remaining amount applied later.

In another embodiment of the invention, a seed grind and potassium bicarbonate are applied to the soil or hydroponic medium of a seed or seeding of a plant grown from a seed in an amount preferably from 20 g of the seed grind and 100 g potassium bicarbonate per kg of the seed to 100,000 g of the seed grind and 200,000 g potassium bicarbonate per kg of the seed; more preferably from 100 g of the seed grind and 500 g potassium bicarbonate per kg of the seed to 75,000 g of the seed grind and 150,000 g potassium bicarbonate per kg of the seed; and most preferably from 200 g of the seed grind and 1000 g potassium bicarbonate per kg of the seed to 50,000 g of the seed grind and 110,000 g potassium bicarbonate per kg of the seed. The seed grind and potassium bicarbonate may be applied before, with, or after the seed or seedling is planted. The seed grind and potassium bicarbonate may optionally be applied as a split application with a portion applied before or when the seed or seedling is planted and the remaining amount applied later.

In another embodiment of the invention, a seed grind and a source of bicarbonate and a source of sugar are applied to the soil or hydroponic medium of a seed or seedling of a plant grown from a seed in an amount preferably from 20 g of the seed grind and 100 g of a source of bicarbonate and 20 g of the source of sugar per kg of the seed to 100,000 g of the seed grind and 200,000 g of a source of bicarbonate and 100,000 g of the source of sugar per kg of the seed; more preferably from 100 g of the seed grind and 500 g of a source of bicarbonate and 100 g of the source of sugar per kg of the seed to 75,000 g of the seed grind and 150,000 g of a source of bicarbonate and 75,000 g of the source of sugar per kg of the seed; and most preferably from 200 g of the seed grind and 1000 g of a source of bicarbonate and 200 g the source of sugar per kg of the seed to 50,000 g of the seed grind and 110,000 g of a source of bicarbonate and 50,000 g the source of sugar per kg of the seed. The seed grind and the source of bicarbonate and the source of sugar may be applied before, with, or after the seed or seedling is planted. The seed grind and the source of bicarbonate and the source of sugar may optionally be applied as a split application with a portion applied before or when the seed or seedling is planted and the remaining amount applied later.

In another embodiment of the invention, a seed grind and a source of sugar are applied to the soil or hydroponic medium of a seed or seedling of a plant grown from a seed in an amount preferably from 20 g of the seed grind and 20 g of the source of sugar per kg of the seed to 100,000 g of the seed grind and 100,000 g of the source of sugar per kg of the seed; more preferably from 100 g of the seed grind and 100 g of the source of sugar per kg of the seed to 75,000 g of the seed grind and 75,000 g of the source of sugar per kg of the seed; and most preferably from 200 g of the seed grind and 200 g of the source of sugar per kg of the seed to 50,000 g of the seed grind and 50,000 g of the source of sugar per kg of the seed. The seed grind and the source of sugar may be applied before, with, or after the seed or seedling is planted. The seed grind and the source of sugar may optionally be applied as a split application with a portion applied before or when the seed or seedling is planted and the remaining amount applied later.

In one embodiment of the invention, a seed grind is applied to the soil or hydroponic medium of a seed or seedling of a plant grown from a seed in an amount of at least 0.89 pounds of the seed grind per acre (1 kg of the seed grind per hectare); more preferably at least 1.78 pounds of the seed grind per acre (2 kg of the seed grind per hectare); and most preferably at least 2.68 pounds of the seed grind per acre (3 kg of the seed grind per hectare). The seed grind may be applied before, with, or after the seed or seedling is planted. The seed grind may optionally be applied as a split application with a portion applied before or when the seed or seedling is planted and the remaining amount applied later.

In one embodiment of the invention, a seed grind is applied to the soil or hydroponic medium of a seed or seedling of a plant grown from a seed in an amount preferably from 0.89 pounds of the seed grind per acre (1 kg of the seed grind per hectare) to 892 pounds of the seed grind per acre (1000 kg of the seed grind per hectare); more preferably from 1.78 pounds of the seed grind per acre (2 kg of the seed grind per hectare) to 669 pounds of the seed grind per acre (750 kg of the seed grind per hectare); and most preferably from 2.68 pounds of the seed grind per acre (3 kg of the seed grind per hectare) to 357 pounds of the seed grind per acre (400 kg of the seed grind per hectare). The seed grind may be applied before, with, or after the seed or seedling is planted. The seed grind may optionally be applied as a split application with a portion applied before or when the seed or seedling is planted and the remaining amount applied later.

In another embodiment of the invention, the seed grind and a source of bicarbonate is applied to the soil or hydroponic medium of a seed or seedling of a plant grown from a seed in an amount preferably from 0.89 pounds of the seed grind and 17.8 pounds of a source of bicarbonate per acre (1 kg of the seed grind and 20 kg of a source of bicarbonate per hectare) to 892 pounds of the seed grind and 1338 pounds of a source of bicarbonate per acre (1000 kg of the seed grind and 1500 kg of a source of bicarbonate per hectare); more preferably from 1.78 pounds of the seed grind and 44.6 pounds of a source of bicarbonate per acre (2 kg of the seed grind and 50 kg of a source of bicarbonate per hectare) to 669 pounds of the seed grind and 1115 pounds of a source of bicarbonate per acre (750 kg of the seed grind and 1250 kg of a source of bicarbonate per hectare); and most preferably from 2.68 pounds of the seed grind and 89.2 pounds of a source of bicarbonate per acre (3 kg of the seed grind and 100 kg of a source of bicarbonate per hectare) to 357 pounds of the seed grind and 892 pounds of a source of bicarbonate per acre (400 kg of the seed grind and 1000 kg of a source of bicarbonate per hectare). The seed grind and the source of bicarbonate may be applied before, with, or after the seed or seedling is planted. The seed grind and the source of bicarbonate may optionally be applied as a split application with a portion applied before or when the seed or seedling is planted and the remaining amount applied later.

In another embodiment of the invention, a seed grind and ammonium bicarbonate is applied to the soil or hydroponic medium of a seed or seeding of a plant grown from a seed in an amount preferably from 0.892 pounds of the seed grind and 17.8 pounds of ammonium bicarbonate per acre (1 kg of the seed grind and 20 kg of ammonium bicarbonate per hectare) to 892 pounds of the seed grind and 1338 pounds of ammonium bicarbonate per acre (1000 kg of the seed grind and 1500 kg of ammonium bicarbonate per hectare); more preferably from 1.78 pounds of the seed grind and 44.6 pounds of ammonium bicarbonate per acre (2 kg of the seed grind and 50 kg of ammonium bicarbonate per hectare) to 669 pounds of the seed grind and 1115 pounds of ammonium bicarbonate per acre (750 kg of the seed grind and 1250 kg of ammonium bicarbonate per hectare); and most preferably from 2.68 pounds of the seed grind and 89.2 pounds of ammonium bicarbonate per acre (3 kg of the seed grind and 100 kg of ammonium bicarbonate per hectare) to 357 pounds of the seed grind and 892 pounds of ammonium bicarbonate per acre (400 kg of the seed grind and 1000 kg of ammonium bicarbonate per hectare). The seed grind and ammonium bicarbonate may be applied before, with, or after the seed or seedling is planted. The seed grind and ammonium bicarbonate may optionally be applied as a split application with a portion applied before or when the seed or seedling is planted and the remaining amount applied later.

In another embodiment of the invention, a seed grind and a source of sugar is applied to the soil or hydroponic medium of a seed or seedling of a plant grown from the seed in an amount preferably from 0.892 pounds of the seed grind and 0.892 pounds of the source of sugar per acre (1 kg of the seed grind and 1 kg of the source of sugar per hectare) to 892 pounds of the seed grind and 892 pounds of the source of sugar per acre (1000 kg of the seed grind and 1000 kg of the source of sugar per hectare); more preferably from 1.78 pounds of the seed grind and 1.78 pounds of the source of sugar per acre (2 kg of the seed grind and 2 kg of the source of sugar per hectare) to 669 pounds of the seed grind and 669 pounds of the source of sugar per acre (750 kg of the seed grind and 750 kg of the source of sugar per hectare); and most preferably from 2.68 pounds of the seed grind and 2.68 pounds of the source of sugar per acre (3 kg of the seed grind and 3 kg of the source of sugar per hectare) to 357 pounds of the seed grind and 357 pounds of the source of sugar per acre (400 kg of the seed grind and 400 kg of the source of sugar per hectare). The seed grind and the source of sugar may be applied before, with, or after the seed or seedling is planted. The seed grind and the source of sugar may optionally be applied as a split application with a portion applied before or when the seed or seedling is planted and the remaining amount applied later.

In another embodiment of the invention, a seed grind and a source of bicarbonate and a source of sugar is applied to the soil or hydroponic medium of a seed or seedling of a plant grown from a seed in an amount preferably from 0.892 pounds of the seed grind and 17.8 pounds of a source of bicarbonate and 0.892 pounds of the source of sugar per acre (1 kg of the seed grind and 20 kg of a source of bicarbonate and 1 kg of the source of sugar per hectare) to 892 pounds of the seed grind and 1338 pounds of a source of bicarbonate and 892 pounds of the source of sugar per acre (1000 kg of the seed grind and 1500 kg of a source of bicarbonate and 1000 kg of the source of sugar per hectare); more preferably from 1.78 pounds of the seed grind and 44.6 pounds of a source of bicarbonate and 1.78 pounds of the source of sugar per acre (2 kg of the seed grind and 50 kg of a source of bicarbonate and 2 kg of the source of sugar per hectare) to 669 pounds of the seed grind and 1115 pounds of a source of bicarbonate and 669 pounds of the source of sugar per acre (750 kg of the seed grind and 1250 kg of a source of bicarbonate and 750 kg of the source of sugar per hectare); and most preferably from 2.68 pounds of the seed grind and 89.2 pounds of a source of bicarbonate and 2.68 pounds of the source of sugar per acre (3 kg of the seed grind and 100 kg of a source of bicarbonate and 3 kg of the source of sugar per hectare) to 357 pounds of the seed grind and 892 pounds of a source of bicarbonate and 357 pounds of the source of sugar per acre (400 kg of the seed grind and 1000 kg of a source of bicarbonate and 400 kg of the source of sugar per hectare). The seed grind and the source of bicarbonate and the source of sugar may be applied before, with, or after the seed or seedling is planted. The seed grind and the source of bicarbonate and the source of sugar may optionally be applied as a split application with a portion applied before or when the seed or seedling is planted and the remaining amount applied later.

In one embodiment of the invention, a seed grind and urea is applied to the soil or hydroponic medium of a seed or seedling of a plant grown from a seed in an amount preferably from 20 g of the seed grind and 100 g of urea per kg of the seed to 100,000 g of the seed grind and 100,000 g of urea per kg of the seed; more preferably from 100 g of the seed grind and 1000 g of urea per kg of the seed to 75,000 g of the seed grind and 20,000 g of urea per kg of the seed; and most preferably from 200 g of the seed grind and 2000 g of urea per kg of the seed to 50,000 g of the seed grind and 20,000 g of urea per kg of the seed. The seed grind and urea may be applied before, with, or after the seed or seedling is planted. The seed grind and urea may optionally be applied as a split application with a portion applied before or when the seed or seedling is planted and the remaining amount applied later.

In one embodiment of the invention, a seed grind, a source of sugar, and urea are applied to the soil or hydroponic medium of a seed or seedling of a plant grown from a seed in an amount preferably from 20 g of the seed grind, 20 g of the source of sugar, and 100 g of urea per kg of the seed to 100,000 g of the seed grind, 100,000 g of the source of sugar, and 100,000 g of urea per kg of the seed; more preferably from 100 g of the seed grind, 100 g of the source of sugar, and 1000 g of urea per kg of the seed to 75,000 g of the seed grind, 75,000 g of the source of sugar, and 20,000 g of urea per kg of the seed; and most preferably from 200 g of the seed grind, 200 g of the source of sugar, and 2000 g of urea per kg of the seed to 50,000 g of a seed grind, 50,000 g of the source of sugar and 20,000 g of urea per kg of the seed. The seed grind, source of sugar, and urea may be applied before, with, or after the seed or seedling is planted. The seed grind, source of sugar, and urea may optionally be applied as a split application with a portion applied before or when the seed or seedling is planted and the remaining amount applied later.

In another embodiment of the invention, a seed grind and a source of bicarbonate and urea is applied to the soil or hydroponic medium of a seed or seedling of a plant grown from a seed in an amount preferably from 20 g of the seed grind and 100 g of a source of bicarbonate and 100 g of urea per kg of the seed to 100,000 g of the seed grind and 200,000 g of a source of bicarbonate and 100,000 g of urea per kg of the seed; more preferably from 100 g of the seed grind and 500 g of a source of bicarbonate and 1000 g of urea per kg of the seed to 75,000 g of the seed grind and 150,000 g of a source of bicarbonate and 50,000 g of urea per kg of the seed; and most preferably from 200 g of the seed grind and 1000 g of a source of bicarbonate and 2000 g of urea per kg of the seed to 50,000 g of the seed grind and 110,000 g of a source of bicarbonate and 50,000 g of urea per kg of the seed. The seed grind and the source of bicarbonate and the urea may be applied before, with, or after the seed or seedling is planted. The seed grind and the source of bicarbonate and urea may optionally be applied as a split application with a portion applied before or when the seed or seedling is planted and the remaining amount applied later.

In another embodiment of the invention, a seed grind and ammonium bicarbonate and urea is applied to the soil or hydroponic medium of a seed or seeding of a plant grown from a seed in an amount preferably from 20 g of the seed grind and 100 g of ammonium bicarbonate and 100 g of urea per kg of the seed to 100,000 g of the seed grind and 200,000 g of ammonium bicarbonate and 100,000 g of urea per kg of the seed; more preferably from 100 g of the seed grind and 500 g of ammonium bicarbonate and 1000 g of urea per kg of the seed to 75,000 g of the seed grind and 150,000 g of ammonium bicarbonate and 50,000 g of urea per kg of the seed; and most preferably from 200 g of the seed grind and 1000 g of ammonium bicarbonate and 2000 g of urea per kg of the seed to 50,000 g of the seed grind and 110,000 g of ammonium bicarbonate and 20,000 g of urea per kg of seed. The seed grind and ammonium bicarbonate and urea may be applied before, with, or after the seed or seedling is planted. The seed grind and ammonium bicarbonate and urea may optionally be applied as a split application with a portion applied before or when the seed or seedling is planted and the remaining amount applied later.

In another embodiment of the invention, a seed grind and sodium bicarbonate and urea is applied to the soil or hydroponic medium of a seed or seeding of a plant grown from a seed in an amount preferably from 20 g of the seed grind and 100 g sodium bicarbonate and 100 g of urea per kg of the seed to 100,000 g of the seed grind and 200,000 g sodium bicarbonate and 100,000 g of urea per kg of the seed; more preferably from 100 g of the seed grind and 500 g sodium bicarbonate and 1000 g of urea per kg of the seed to 75,000 g of the seed grind and 150,000 g sodium bicarbonate and 50,000 g of urea per kg of the seed; and most preferably from 200 g of the seed grind and 1000 g sodium bicarbonate and 2000 g of urea per kg of the seed to 50,000 g of the seed grind and 110,000 g sodium bicarbonate and 20,000 g of urea per kg of the seed. The seed grind and sodium bicarbonate may be applied before, with, or after the seed or seedling is planted. The seed grind and sodium bicarbonate may optionally be applied as a split application with a portion applied before or when the seed or seedling is planted and the remaining amount applied later.

In another embodiment of the invention, a seed grind and potassium bicarbonate and urea are applied to the soil or hydroponic medium of a seed or seeding of a plant grown from a seed in an amount preferably from 20 g of the seed grind and 100 g potassium bicarbonate and 100 g of urea per kg of the seed to 100,000 g of the seed grind and 200,000 g potassium bicarbonate 100,000 g of urea per kg of the seed; more preferably from 100 g of the seed grind and 500 g potassium bicarbonate and 1000 g of urea per kg of the seed to 75,000 g of the seed grind and 150,000 g potassium bicarbonate and 50,000 g of urea per kg of the seed; and most preferably from 200 g of the seed grind and 1000 g potassium bicarbonate and 2000 g of urea per kg of the seed to 50,000 g of the seed grind and 110,000 g potassium bicarbonate and 20,000 g of urea per kg of the seed. The seed grind and potassium bicarbonate and may be applied before, with, or after the seed or seedling is planted. The seed grind and potassium bicarbonate and urea may optionally be applied as a split application with a portion applied before or when the seed or seedling is planted and the remaining amount applied later.

In another embodiment of the invention; a seed grind, ammonium bicarbonate, one or more of an alkali bicarbonate selected from the group sodium bicarbonate and potassium bicarbonate, and urea are applied to the soil or hydroponic medium of a seed or seeding of a plant grown from a seed in an amount preferably from 20 g of the seed grind and 100 g of ammonium bicarbonate and 100 g of the alkali bicarbonate and 100 g of urea per kg of the seed to 100,000 g of the seed grind and 200,000 g of ammonium bicarbonate and 200,000 g of the alkali bicarbonate and 100,000 g of urea per kg of the seed; more preferably from 100 g of the seed grind and 500 g of ammonium bicarbonate and 500 g of the alkali bicarbonate and 1000 g of urea per kg of the seed to 75,000 g of the seed grind and 150,000 g of ammonium bicarbonate and 150,000 g of the alkali bicarbonate and 50,000 g of urea per kg of the seed; and most preferably from 200 g of the seed grind and 1000 g of ammonium bicarbonate and 1000 g of the alkali bicarbonate and 2000 g of urea per kg of the seed to 50,000 g of the seed grind and 110,000 g of ammonium bicarbonate and 110,000 g of the alkali bicarbonate and 20,000 g of urea per kg of seed. The seed grind, ammonium bicarbonate, the alkali bicarbonate, and urea may be applied before, with, or after the seed or seedling is planted. The seed grind, ammonium bicarbonate, the alkali bicarbonate, and urea may optionally be applied as a split application with a portion applied before or when the seed or seedling is planted and the remaining amount applied later.

In another embodiment of the invention, a seed grind and a source of bicarbonate and a source of sugar and urea are applied to the soil or hydroponic medium of a seed or seedling of a plant grown from a seed in an amount preferably from 20 g of the seed grind and 100 g of a source of bicarbonate and 20 g of the source of sugar and 100 g of urea per kg of the seed to 100,000 g of the seed grind and 200,000 g of a source of bicarbonate and 100,000 g of the source of sugar and 100,000 g of urea per kg of the seed; more preferably from 100 g of the seed grind and 500 g of a source of bicarbonate and 100 g of the source of sugar 1000 g of urea per kg of the seed to 75,000 g of the seed grind and 150,000 g of a source of bicarbonate and 75,000 g of the source of sugar and 50,000 g of urea per kg of the seed; and most preferably from 200 g of the seed grind and 1000 g of a source of bicarbonate and 200 g of the source of sugar and 2000 g of urea per kg of the seed to 50,000 g of the seed grind and 110,000 g of a source of bicarbonate and 50,000 g of the source of sugar and 20,000 g of urea per kg of the seed. The seed grind and the source of bicarbonate and the source of sugar and the urea may be applied before, with, or after the seed or seedling is planted. The seed grind and the source of bicarbonate and the source of sugar and the urea may optionally be applied as a split application with a portion applied before or when the seed or seedling is planted and the remaining amount applied later.

In one embodiment of the invention, a seed grind and urea are applied to the soil or hydroponic medium of a seed or seedling of a plant grown from a seed in an amount preferably from 0.892 pounds of the seed grind and 1.78 pounds of urea per acre (1 kg of the seed grind and 2 kg of urea per hectare) to 892 pounds of the seed grind and 357 pounds of urea per acre (1000 kg of the seed grind and 400 kg of urea per hectare); more preferably from 1.78 pounds of the seed grind and 8.92 pounds of urea per acre (2 kg of the seed grind and 10 kg of urea per hectare) to 669 pounds of the seed grind and 268 pounds of urea per acre (750 kg of the seed grind and 300 kg of urea per hectare); and most preferably from 2.68 pounds of the seed grind and 17.8 pounds of urea per acre (3 kg of the seed grind and 20 kg of urea per hectare) to 357 pounds of the seed grind and 223 pounds of urea per acre (400 kg of the seed grind and 250 kg of urea per hectare). The seed grind and urea may be applied before, with, or after the seed or seedling is planted. The seed grind and urea may optionally be applied as a split application with a portion applied before or when the seed or seedling is planted and the remaining amount applied later.

In another embodiment of the invention, a seed grind and a source of bicarbonate and urea is applied to the soil or hydroponic medium of a seed or seedling of a plant grown from a seed in an amount preferably from 0.892 pounds of the seed grind and 17.8 pounds of a source of bicarbonate and 1.78 pounds of urea per acre (1 kg of the seed grind and 20 kg of a source of bicarbonate and 2 kg of urea per hectare) to 892 pounds of the seed grind and 1338 pounds of a source of bicarbonate and 357 pounds of urea per acre (1000 kg of the seed grind and 1500 kg of a source of bicarbonate and 400 kg of urea per hectare); more preferably from 1.78 pounds of the seed grind and 44.6 pounds of a source of bicarbonate and 8.92 pounds of urea per acre (2 kg of the seed grind and 50 kg of a source of bicarbonate and 10 kg of urea per hectare) to 669 pounds of the seed grind and 1115 pounds of a source of bicarbonate and 268 pounds of urea per acre (750 kg of the seed grind and 1250 kg of a source of bicarbonate and 300 kg of urea per hectare); and most preferably from 2.68 pounds of the seed grind and 89.2 pounds of a source of bicarbonate and 17.8 pounds of urea per acre (3 kg of the seed grind and 100 kg of a source of bicarbonate and 20 kg of urea per hectare) to 357 pounds of the seed grind and 892 pounds of a source of bicarbonate and 223 pounds of urea per acre (400 kg of the seed grind and 1000 kg of a source of bicarbonate and 250 kg of urea per hectare). The seed grind and the source of bicarbonate and the urea may be applied before, with, or after the seed or seedling is planted. The seed grind and the source of bicarbonate and the urea may optionally be applied as a split application with a portion applied before or when the seed or seedling is planted and the remaining amount applied later.

In another embodiment of the invention, a seed grind and ammonium bicarbonate and urea are applied to the soil or hydroponic medium of a seed or seeding of a plant grown from a seed in an amount preferably from 0.892 pounds of the seed grind and 17.8 pounds of ammonium bicarbonate and 1.78 pounds of urea per acre (1 kg of the seed grind and 20 kg of ammonium bicarbonate and 2 kg of urea per hectare) to 892 pounds of the seed grind and 1338 pounds of ammonium bicarbonate and 357 pounds of urea per acre (1000 kg of the seed grind and 1500 kg of ammonium bicarbonate and 400 kg of urea per hectare); more preferably from 1.78 pounds of the seed grind and 44.6 pounds of ammonium bicarbonate and 8.92 pounds of urea per acre (2 kg of the seed grind and 50 kg of ammonium bicarbonate and 10 kg of urea per hectare) to 669 pounds of the seed grind and 1115 pounds of ammonium bicarbonate and 268 pounds of urea per acre (750 kg of the seed grind and 1250 kg of ammonium bicarbonate and 300 kg of urea per hectare); and most preferably from 2.68 pounds of the seed grind and 89.2 pounds of ammonium bicarbonate and 17.8 pounds of urea per acre (3 kg of the seed grind and 100 kg of ammonium bicarbonate and 20 kg of urea per hectare) to 357 pounds of the seed grind and 892 pounds of ammonium bicarbonate and 223 pounds of urea per acre (400 kg of the seed grind and 1000 kg of ammonium bicarbonate and 250 kg of urea per hectare). The seed grind and ammonium bicarbonate and the urea may be applied before, with, or after the seed or seedling is planted. The seed grind and the ammonium bicarbonate and the urea may optionally be applied as a split application with a portion applied before or when the seed or seedling is planted and the remaining amount applied later.

In another embodiment of the invention; a seed grind, ammonium bicarbonate, one or more of an alkali bicarbonate selected from the group sodium bicarbonate and potassium bicarbonate, and urea are applied to the soil or hydroponic medium of a seed or seeding of a plant grown from a seed in an amount preferably from 0.892 pounds of the seed grind and 17.8 pounds of ammonium bicarbonate and 17.8 pounds of the alkali bicarbonate and 1.78 pounds of urea per acre (1 kg of the seed grind and 20 kg of ammonium bicarbonate and 20 kg of the alkali bicarbonate and 2 kg of urea per hectare) to 892 pounds of the seed grind and 1338 pounds of ammonium bicarbonate and 1338 pounds of the alkali bicarbonate and 357 pounds of urea per acre (1000 kg of the seed grind and 1500 kg of ammonium bicarbonate and 1500 kg of the alkali bicarbonate and 400 kg of urea per hectare); more preferably from 1.78 pounds of the seed grind and 44.6 pounds of ammonium bicarbonate and 44.6 pounds of the alkali bicarbonate and 8.92 pounds of urea per acre (2 kg of the seed grind and 50 kg of ammonium bicarbonate and 50 kg of the alkali bicarbonate and 10 kg of urea per hectare) to 669 pounds of the seed grind and 1115 pounds of ammonium bicarbonate and 1115 pounds of the alkali bicarbonate and 268 pounds of urea per acre (750 kg of the seed grind and 1250 kg of ammonium bicarbonate and 1250 kg of the alkali bicarbonate and 300 kg of urea per hectare); and most preferably from 2.68 pounds of the seed grind and 89.2 pounds of ammonium bicarbonate and 89.2 pounds of the alkali bicarbonate and 17.8 pounds of urea per acre (3 kg of the seed grind and 100 kg of ammonium bicarbonate grind and 100 kg of the alkali bicarbonate and 20 kg of urea per hectare) to 357 pounds of the seed grind and 892 pounds of ammonium bicarbonate and 892 pounds of the alkali bicarbonate and 223 pounds of urea per acre (400 kg of the seed grind and 1000 kg of ammonium bicarbonate and 1000 kg of the alkali bicarbonate and 250 kg of urea per hectare). The seed grind, the ammonium bicarbonate, the alkali bicarbonate, and the urea may be applied before, with, or after the seed or seedling is planted. The seed grind, the ammonium bicarbonate, the alkali bicarbonate, and the urea may optionally be applied as a split application with a portion applied before or when the seed or seedling is planted and the remaining amount applied later.

In another embodiment of the invention, a seed grind and a source of bicarbonate and of a source of sugar and urea are applied to the soil or hydroponic medium of a seed or seedling of a plant grown from a seed in an amount preferably from 0.892 pounds of the seed grind and 17.8 pounds of a source of bicarbonate and 0.892 pounds of the source of sugar and 1.78 pounds of urea per acre (1 kg of the seed grind and 20 kg of a source of bicarbonate and 1 kg of the source of sugar and 2 kg of urea per hectare) to 892 pounds of the seed grind and 1338 pounds of a source of bicarbonate and 892 pounds of the source of sugar and 357 pounds of urea per acre (1000 kg of the seed grind and 1500 kg of a source of bicarbonate and 1000 kg of the source of sugar and 400 kg of urea per hectare); more preferably from 1.78 pounds of the seed grind and 44.6 pounds of a source of bicarbonate and 1.78 pounds of the source of sugar and 8.92 pounds of urea per acre (2 kg of the seed grind and 50 kg of a source of bicarbonate and 2 kg of the source of sugar and 10 kg of urea per hectare) to 669 pounds of the seed grind and 1115 pounds of a source of bicarbonate and 669 pounds of the source of sugar and 268 pounds of urea per acre (750 kg of the seed grind and 1250 kg of a source of bicarbonate and 750 kg of the source of sugar and 300 kg of urea per hectare); and most preferably from 2.68 pounds of the seed grind and 89.2 pounds of a source of bicarbonate and 2.68 pounds of the source of sugar and 17.8 pounds of urea per acre (3 kg of the seed grind and 100 kg of a source of bicarbonate and 3 kg of the source of sugar and 20 kg of urea per hectare) to 357 pounds of the seed grind and 892 pounds of a source of bicarbonate and 357 pounds of the source of sugar and 223 pounds of urea per acre (400 kg of the seed grind and 1000 kg of a source of bicarbonate and 400 kg of the source of sugar and 250 kg of urea per hectare). The seed grind and the source of bicarbonate and the source of sugar and the urea may be applied before, with, or after the seed or seedling is planted. The seed grind and the source of bicarbonate and the source of sugar and the urea may optionally be applied as a split application with a portion applied before or when the seed or seedling is planted and the remaining amount applied later.

The seed grind of the invention comprises one or more selected from the group comprising rice seed grind, brown rice seed grind, white rice seed grind, rough rice seed grind, rye seed grind, cornmeal seed grind, soy seed grind, buckwheat seed grind, triticale seed grind, wheat seed grind, whole grain wheat seed grind, oat seed grind, barley seed grind, and/or more. Preferably the seed grind is rough rice seed grind.

The source of fertilizer nutrient in the inventive fertilizer preferably comprises a nitrogen fertilizer selected from but not limited to the group comprising urea, ammonium bicarbonate, monoammonium phosphate, ammonium nitrate, ammonium sulfate, sodium nitrate, potassium nitrate, calcium nitrate, urea ammonium nitrate (UAN), and/or diammonium phosphate. More preferably, the nitrogen fertilizer can be urea. The urea employed in the inventive fertilizer can be substituted or supplemented with compounds selected from the group comprising ureaform, urea formaldehyde, methylene urea, methylene diurea and/or dimethylenetriurea.

The inventive fertilizer and plant growth promoter each separately can be formed into granules, tablets, or supergranules using bio-degradable binders (adherents), lubricants, glidants, and antiadherents that provide additional carbon for uptake by plant roots. These binders (adherents), lubricants, glidants, and antiadherents include waxes such as up to 10% paraffin wax, up to 10% stearic acid, up to 10% magnesium stearate, and/or up to 10% corn starch. A preferable amount of binders, lubricants, glidants, and antiadherents, can be up to 5% paraffin wax, up to 5% stearic acid, up to 5% magnesium stearate, and/or up to 5% corn starch; and the most preferable amount 0.2%-1.5% stearic acid, 0.2%-1.5% magnesium stearate, and/or 0.2%-1.5% corn starch. Some other possible binders (adherents), include sugars such as corn syrup, maltodextrin, sucrose, lactose, and glucose; starches like tapioca starch; gums like gelatin; synthetic polymers like polyvinylpyrrolidone (PVP), polyethylene glycol (PEG); cellulose and cellulose derivatives like methylcellulose and ethylcellulose; and waxes including paraffin wax, beeswax, palm wax, and soy bean wax. Other possible lubricants, glidants, and anitadherents include; talc, corn starch, colloidal silica, boric acid, sodium lauryl sulfate, magnesium lauryl sulfate glyceryl palmitostearate, glyceryl behenate, sodium benzoate, sodium oleate, and sodium stearyl fumarate.

When used to grow rice, the invention can be placed preferably in or on the soil before 8 weeks after the seed is planted, preferably before or at the 4 leaf stage of the plant, and more preferably at planting of the rice seed.

As demonstrated by the following examples, the inventive fertilizer and plant growth promoter, and method of application produces unexpected improvement in early growth of plants and roots and in crop yield. The inventive fertilizer and plant growth promoter, and method of application can surprisingly produce an increase in crop yield of up to 100%. The unexpected yields for rice can be up to 988 bushels per hectare (400 bushels per acre) or more. The average yield in 2018 reported by the University of Arkansas for the rice variety (Diamond™) grown in the example was 494 bushels per hectare (200 bushels per acre) (Hardke, Jarrod et al. "Rice Farming for Profit," University of Arkansas Division of Agriculture, January 2018). For the rice grown in Example 1 with the invention and for the baseline, the rice plants grown were given 14% more nitrogen than is typically recommended. This additional nitrogen was given for increase in the yields of the crop with the invention by increasing the amount of nitrogen and then comparing the resulting yields with the yield for the baseline that was given the same increased level of nitrogen. However, the nitrogen still could have been a limiting factor for crop yield and the yields of the invention could be more than shown by the example.

All crop yields were compared for crops grown with same level of nitrogen.

A particularly effective fertilizer of the invention (C. LE of Example 1) comprised 1.15% brown rice seed grind, 63.8% bicarbonate from a combination of sodium bicarbonate and ammonium bicarbonate, and 9.66% fertilizer nutrient from a combination of urea and ammonium bicarbonate. The inventive fertilizer was applied to grow rice when the seed was planted at a rate of 328 kg/hectare (293 pounds per acre) and produced an increase in crop yield of 45.7% compared to the yield for the baseline that received the same level of nitrogen as urea and the same starter fertilizer as the rice using the inventive fertilizer.

A particularly effective plant growth promoter of the invention (E. LE of Example 1) was used to grow rice from seed that was planted immediately after applying a starter fertilizer comprising 68 kg/hectare (61 pounds/acre) urea. The inventive plant growth promoter comprised 50% potassium bicarbonate and 50% brown rice seed grind. The plant growth promoter was applied to grow rice at the time of applying the starter fertilizer, on the same day that the seed was planted and at a rate of 273 kg/hectare (244 pounds/acre). The fertilizer was placed 7.6-10.2 cm (3-4 inches) beneath the soil surface. The resulting rough rice yield from this fertilizer was 45% more than the rough rice yield from rice plants grown at the same time under the same conditions with the same starter fertilizer but without using the plant growth promoter.

An effective method of the invention includes the following:
1) Performing soil tests to identify primary nutrient, secondary nutrient, and micronutrient deficiencies; 2) Applying starter nutrients to the soil early in the crop growth at the levels recommended for the crop being grown and based on the expected crop yield per acre and the soil test results; 3) Applying the inventive fertilizer and/or plant growth promoter to the soil early in the crop growth before, at, with, or after applying the starter nutrients by burying the fertilizer and/or plant growth promoter, side applying the fertilizer and/or plant growth promoter, broadcasting the fertilizer and/or plant growth promoter, injecting the fertilizer and/or plant growth promoter, spraying the fertilizer and/or plant growth promoter, or any combination of these at the levels recommended for the crop being grown and based on the expected crop yield per acre and the soil test results. Preferably the inventive fertilizer and/or plant growth promoter is applied just before, with, or just after the seed is planted.

An additional effective method of the invention includes the following:
1) Performing soil tests to identify primary nutrient, secondary nutrient, and micronutrient deficiencies; 2) Applying starter nutrients to the soil early in the crop growth at more than the levels typically recommended for the crop being grown and based on the amount of inventive fertilizer and/or plant growth promoter being applied; 3) Applying the inventive fertilizer and/or plant growth promoter to the soil early in the crop growth before, at, with, or after applying the starter nutrients by burying the fertilizer and/or plant growth promoter, side applying the fertilizer and/or plant growth promoter, broadcasting the fertilizer and/or plant growth promoter, injecting the fertilizer and/or plant growth promoter, spraying the fertilizer and/or plant growth promoter, or any combination of these at the levels recommended for the crop being grown and based on the expected crop yield per acre, the amount of inventive fertilizer and/or plant growth promoter being applied, and the soil test results. Preferably the inventive fertilizer and/or plant growth promoter is applied just before, with, or just after the seed is planted.

An additional effective method of the invention includes the following:
1) Reserving a portion of harvest of a crop to form into a seed grind; 2) Performing soil tests to identify primary nutrient, secondary nutrient, and micronutrient deficiencies; 3) Applying starter nutrients to the soil early in growth of a crop being grown at more than the levels typically recommended for the crop being grown and based on the amount of seed grind being applied; 4) Applying the seed grind to the soil early in the growth of the crop being grown before, at, with, or after applying the starter nutrients by burying the seed grind, side applying the seed grind, broadcasting the seed grind, injecting the seed grind, spraying the seed grind, or any combination of these at the levels recommended for the crop being grown and based on the expected crop yield per acre, the amount of seed grind being applied, and the soil test results. Preferably the seed grind is applied just before, with, or just after the seed is planted.

An additional effective method of the invention includes the following:
1) Reserving a portion of harvest of a crop to form into a seed grind; 2) Forming inventive fertilizer and/or plant growth promoter into a mixture, slurry, suspension, granule, or pellet comprising the seed grind and other components of the fertilizer and/or plant growth promoter; 3) Performing soil tests to identify primary nutrient, secondary nutrient, and micronutrient deficiencies; 3) Applying starter nutrients to the soil early in a plant growth at more than the levels typically recommended for the plant being grown and based on the amount of inventive fertilizer and/or plant growth promoter being applied; 4) Applying the inventive fertilizer and/or plant growth promoter to the soil early in the plant growth before, at, with, or after applying the starter nutrients by burying the inventive fertilizer and/or plant growth promoter, side applying the inventive fertilizer and/or plant growth promoter, broadcasting the inventive fertilizer and/or plant growth promoter, injecting the inventive fertilizer and/or plant growth promoter, spraying the inventive fertilizer and/or plant growth promoter, or any combination of these at the levels recommended for the plant being grown and based on the expected crop yield per acre, the amount of inventive fertilizer and/or plant growth promoter being applied, and the soil test results. Preferably the inventive fertilizer and/or plant growth promoter is applied just before, with, or just after the seed is planted.

When the inventive fertilizer and/or plant growth promoter is used, more nitrogen should be applied to the crop than is typically applied because the increased plant growth will require increased amounts of nitrogen. The nitrogen can be applied as a starter fertilizer as well as later in the crop growth. The application of additional nitrogen with the inventive fertilizer and/or plant growth promoter produces an increase in crop yield that is much more than is produced by applying the same level of nitrogen fertilizer without the inventive fertilizer and/or plant growth promoter.

The present invention is free of components unsuitable for use to grow plants. Hence, the fertilizer is free of components harmful to humans or animals such as lithium and heavy metals. For this invention free means that the levels meet the limits set by government for land application and that the levels are below accepted levels that are shown to cause harm to humans or animals consuming the plant or crop.

The present invention can be utilized for growing rice worldwide in a number of various methods. It is important for all of the following methods that are listed that the soil used to grow the rice be verified as suitable soil for growing rice; and if not, the soil should be enhanced to a suitable pH and typical soil elements as has been shown in the examples. With soil preparation made, the following methods of applying the invention can be used.

All of these examples use rice seed grind which can be provided by grinding up rough rice or brown rice to form a seed grind. For example, a rice farmer can now form the seed grind using seeds from a previous crop. Previous to the present invention, a small percentage of the crop was saved for use in planting for growing the next season. However, now with the present invention, an additional small percentage of the crop should be retained for grinding into a seed grind for a surprisingly increased growth the next season. The increased growth more than offsets the additional small percentage of the crop retained. Preferably, the rice seed grind is commercially formulated in a form for field application and contains further ingredients as discussed herein to optimize the early growth of rice.

We have pointed out that in one method of application, the rice seed grind can be used as a powder and mixed with other ingredients of the invention as a powder and applied to the soil as the seed is planted either in the row with the seed or below the soil 0.635 cm to 1.27 cm (¼ to 1½ inch) deep as recommended by the University of Arkansas for seed placement and only 2.54 cm or 5.08 cm (one or two inches) from the seed. This gives quick availability to the seed of the growth promoter/fertilizer.

In another method, the rice seed grind and at least one of our other inventive growth promoters can be formed into a pellet or granule by compressing the ingredients together or by agglomerating them together with a binding agent such as lignocellulose. These pellets or granules are best as small granules 1 mm or less so they can be buried together with the seed or buried at 0.635 cm to 3.81 cm (¼ to 1½ inches) deep and only 2.54 cm or 5.08 cm (one or two inches) away from the seed, thus giving quick response to growth needs.

In another method of application, the rice seed grind containing inventive growth promoter can be applied with a starter fertilizer of the applicator's choice both as a powder or the inventive fertilizer can be pelletized or agglomerated with the starter fertilizer and applied with the seed or next to the seed buried in the soil 0.635 cm to 1.27 cm (¼ to 1½ inch) deep.

In a still further method, the rice seed grind containing the other inventive growth promoters can be applied with full fertilizer of the applicator's choice both as a powder or small granule when applied to the soil.

In still a further application method, the rice seed grind containing inventive growth promoter can be granulated with the full fertilizer of the applicator's choice as a large compressed pellet called a supergranule when used for rice fertilization and buried as supergranules are currently buried.

In another method of the application, the rice seed grind containing inventive growth promoter can be mixed with other fertilization of the applicator's choice and buried as a package of quick dissolving media and buried in the same manner as supergranules.

In another method of the application, the rice seed grind containing inventive growth promoter can be pelletized or agglomerated to a size of typical urea fertilizer which has an SGN of approximately 2.85 mm, blended with granules of urea, and can be applied to rice by airplane or some other suitable spreading device.

Another method of using rice seed grind and/or other elements of the invention can be in the growth of paddy rice where transplanting occurs. The invention can be applied with the seeds and/or with transplanting. When applied with the seeds, it is best applied in the powder form with the applicator's choice of starter fertilizer. Then at transplanting an additional amount of the inventive promoter/fertilizer can be important to achieve best yields.

A particle size range of a seed grind can be preferably 95% of the particles by weight between 44 micrometers (325 ISO sieve designation) and 2.00 mm (10 ISO sieve designation) or preferably 90% of the particle by weight between 63 micrometers (230 ISO sieve designation) and 2.00 mm (10 ISO sieve designation). We believe that seed grinds having a higher percentage of larger particle sizes will have a slower release of benefits to a plant over time and that seed grinds having a higher percentage of lower particles sizes will have a faster release of benefits to a plant over time. Thus, the size of the seed grind can be adjusted for the particular application as desired.

In all of the above methods, it is important for the best increase in yield of rice that nitrogen and potassium should be increased by 15% to 25% more than conventional applications so that the increase in yield provide by the rice seed grind containing enhancer of the invention is not later limited by the availability of nitrogen and potassium. The University of Arkansas recommends using a GreenSeeker® in determining the need for adding nitrogen at mid-season so yields are not limited.

The present invention will be demonstrated with reference to the following examples, which are of an illustrative nature only and which are to be construed as non-limiting.

EXAMPLES

In Examples 1-5, the following abbreviations are used to refer to compounds in the formulations and/or in the starter fertilizer:

ABC—ammonium bicarbonate
CS—corn starch
KBC—potassium bicarbonate
MS—magnesium stearate
PS—powdered sugar
BRSG—brown rice seed grind
SA—stearic acid
SBC—sodium bicarbonate
SP—single super phosphate
TSP—triple super phosphate The soils used for each of the examples came from local top soil and were tested for pH, P, K, Ca, Mg, S, Na, Fe, Mn, Zn, Cu, B, N, and C. The results of these tests for the soils used for are presented in Table 2. For Example 1, S-1 and S-2 were mixed.

TABLE 1

| Soil Test Results | | | | | | | | | | | | |
|---|---|---|---|---|---|---|---|---|---|---|---|---|
| Soil Sample ID | pH | P | K | Ca | Mg | Na | Fe | Mn | Zn | Cu | B | Al |
| | | | | | | ppm | | | | | | |
| S-1 | 7.12 | <0.1 | 51 | 3558 | 135 | 41 | 16 | 29 | 1 | 1 | 0.2 | 200 |
| S-2 | 6.45 | <0.1 | 43 | 3716 | 132 | 42 | 14 | 28 | 1 | 1 | 0.2 | 202 |

TABLE 1-continued

Soil Test Results

| Soil Sample ID | pH | P | K | Ca | Mg | Na | Fe | Mn | Zn | Cu | B | Al |
|---|---|---|---|---|---|---|---|---|---|---|---|---|
| | | | | | | ppm | | | | | | |
| S-3 | 5.9 | 16.3 | 206 | 1361 | 138 | 14 | 126 | 217 | 2.5 | 0.8 | 0.4 | *NM |
| S-4 | 5.72 | 14.6 | 60.4 | 634 | 49.5 | 7.02 | 93 | 156 | 3.7 | 5.7 | 0.4 | *NM |

*NM = not measured

TABLE 2

Soil Test Results, cont.

| Soil Sample ID | Total N | Total C % | S |
|---|---|---|---|
| S-1 | 0.041 | 2.73 | 0.022 |
| S-2 | 0.097 | 3.07 | 0.021 |
| S-3 | 0.1123 | 2.6468 | 0.037 |

The soils used for each example were adjusted to provide a soil that was better suited for growing the particular crop of the example.

Example 1: Growing Rice to Compare Lowering Levels of Applications and Timing of Applications of the Invention For this example, rice was planted in containers in a greenhouse following the method of planting dry rice seed and then flooding with water later after the rice seedling are established. Different timings and levels of applying formulations of fertilizer and enhancer were planned. Abbreviations were chosen as listed below to represent the levels and timings of the applications.

EP—fertilizer or enhancer was applied only when the seed is planted

P2—fertilizer or enhancer was applied when the seed is planted an again 2 weeks after planting E3—fertilizer or enhancer was applied when the seedling reaches the 3 leaf stage E4—fertilizer or enhancer was applied when the seedling reaches the 4 leaf stage HE—high level formulation of fertilizer or enhancer applied LE—low level formulation of fertilizer or enhancer applied For Example 1, local top soil was sieved to remove rocks. 16 kg (35 pounds) of the soil was placed in 19 liter (5 gallon) containers in a greenhouse. Prior to planting, rice seeds were weighed to ensure that all seeds to be planted fell within the range of 0.0225 g to 0.0264 g. This rice seed was *Oryza sativa* long grain rice variety Diamond™ seed treated with Nipslt Suite® (an insecticide and fungicide) and AV-1011® (a bird repellent) which was carefully selected as representative of all rice grown commercially and provides an excellent model for testing commercial rice. Three buckets were prepared for each formulation and timing. The steps to the testing included:

Step 1: Adding 2.0 g of triple super phosphate.

Step 2: Adding urea and KCl to the buckets as pre-fertilizer following the rates for planting shown in Table 4.

Step 3: For the EP and P2 tests, mixing the amount of each formulation shown in Table 3 into the top inch of soil in the appropriate containers. Note, the formulations for each label (A, B, C, D, E, F, G, and H) are shown in Table 5.

Step 4: Planting 5 rice seeds in each container by pushing the seed 1.9 cm (¾ inch) beneath the soil surface and fill the hole with sand.

Step 5: When the seedlings emerged, thinned each container to 3 plants.

Step 6: Watered to maintain normal moisture levels for upland crops.

Step 7: Two weeks after planting, adding additional enhancers or nutrients to the containers labeled P2 using the amounts for the formulations in Table 3 and Table 4. These were buried as packets about 7.6 cm (3 inches) beneath the surface of the soil.

Step 8: When the plants reached the three leaf stage, adding additional enhancer or nutrient to the containers labeled E3 using the amounts in Table 3 and Table 4. These were buried as packets about 7.6 cm (3 inches) beneath the surface of the soil and then the containers were flooded.

Step 9: When the plants reached the 4 leaf stage, adding additional formulation and/or nutrients to the containers marked EP, E4, or P2 according to the amounts in Table 3 and Table 4. These were buried as packets about 7.6 cm (3 inches) beneath the surface of the soil and then the containers were flooded.

All of the containers were given equal amounts of total nitrogen and equal amounts of total potassium.

TABLE 3

Amount of Formulation Shown in Table 5 That Was Applied for Example 1 Tests at Various Times

| Formulation Label | Formulation Amount per Container - placed according to timing, i.e. EP, P2, E3, E4 | |
|---|---|---|
| | high application (HE) | low application (LE) |
| A | Baseline - no formulation given | Baseline - no formulation given |
| B | E3: mixture of 3.31 g ABC, 1.27 g urea, 7.14 g SBC, 0.140 g CS, 0.140 g SA, and 0.140 g MS = 12.14 g total at 3 leaf stage | None planted |

TABLE 3-continued

Amount of Formulation Shown in Table 5 That Was Applied for Example 1 Tests at Various Times

| Formulation Label | Formulation Amount per Container - placed according to timing, i.e. EP, P2, E3, E4 | |
|---|---|---|
| | high application (HE) | low application (LE) |
| | E4: mixture of 3.31 g ABC, 1.27 g urea, 7.14 g SBC, 0.140 g CS, 0.140 g SA, and 0.140 g MS = 12.14 g total at four leaf stage | |
| C | None planted | EP: mixture of 0.655 g ABC, 0.252 g urea, 1.41 g SBC, 0.028 g BRSG, 0.028 g SA, and 0.028 g MS = 2.4 g total at planting seed |
| | None planted | P2: mixture of 0.655 g ABC, 0.252 g urea, 1.41 g SBC, 0.028 g BRSG, 0.028 g SA, and 0.028 g MS at planting seed and again at 2 weeks = 4.8 g total |
| | E3: mixture of 3.31 g ABC, 1.27 g urea, 7.14 g SBC, 0.140 g BRSG, 0.140 g SA, and 0.140 g MS = 12.14 g total at 3 leaf stage | None planted |
| | E4: mixture of 3.31 g ABC, 1.27 g urea, 7.14 g SBC, 0.140 g BRSG, 0.140 g SA, and 0.140 g MS = 12.14 g total at 4 leaf stage | None planted |
| D | EP: 2.0 g BRSG at planting seed | EP: 1.0 g BRSG at planting seed |
| E | EP: mixture of 2.0 g KBC and 2.0 g BRSG = 4.0 g total At planting seed | EP: mixture of 1.0 g KBC and 1.0 g BRSG = 2.0 g total At planting seed |
| F | EP: mixture of 2.0 g SBC and 2.0 g BRSG = 4.0 g total At planting seed | EP: mixture of 1.0 g SBC and 1.0 g BRSG = 2.0 g total At planting seed |
| G | EP: mixture of 2.0 g SBC, 1.0 g BRSG, and 1.0 g PS = 4.0 g total At planting seed | EP: mixture of 1.0 g SBC, 0.5 g BRSG, 0.5 g PS = 2.0 g total At planting seed |
| H | EP: mixture of 2.0 g KBC, 1.0 g BRSG, and 1.0 g PS = 4.0 g total At planting seed | EP: mixture of 1.0 g KBC, 0.5 g BRSG, 0.5 g PS = 2.0 g total At planting seed |

TABLE 4

Amount of Urea and KCl to Apply for Example 1 Tests at Various Times

| Formulation Label | Nitrogen Application at Planting (g/container) | K Application at Planting (g/container) | Nitrogen Application at 2 weeks or 3 leaf stage as noted, (g/container) | Urea Application at 4 leaf stage before flooding (g/container) |
|---|---|---|---|---|
| A | All: 0.23 g N as urea | All: 1.15 g K as KCl | EP: none<br><br>P2: 0.23 g N as urea at 2 weeks<br>E3: 1.17 g N as urea at 3 leaf then flood<br>E4: none | EP: 1.17 g N at 4 leaf as urea<br>P2: 0.938 g N as urea at 4 leaf<br>E3: none<br><br>E4: 1.17 g N as urea |
| B | All: 0.23 g N as urea | All: 1.15 g K as KCl | E3: 1.17 g N as ABC and urea in formulation at 3 leaf then flood<br>E4: none | E3: none<br><br><br><br>E4: 1.17 g N as ABC and urea in formulation |

TABLE 4-continued

Amount of Urea and KCl to Apply for Example 1 Tests at Various Times

| Formulation Label | Nitrogen Application at Planting (g/container) | K Application at Planting (g/container) | Nitrogen Application at 2 weeks or 3 leaf stage as noted, (g/container) | Urea Application at 4 leaf stage before flooding (g/container) |
|---|---|---|---|---|
| C | EP: 0.23 g N as ABC and urea in formulation | All: 1.15 g K as KCl | EP: none | EP: 1.17 g N as urea |
|   | P2: 0.23 g N as ABC and urea in formulation |   | P2: 0.23 g N as ABC and urea in formulation at 2 weeks | P2: 0.938 g N as urea |
|   | E3: 0.23 g N as urea |   | E3: 1.17 g N as ABC and urea in formulation at 3 leaf stage | E3: none |
|   | E4: 0.23 g N as urea |   | E4: none | E4: 1.17 g N as ABC and urea in formulation |
| D | 0.23 g N as urea | 1.15 g K as KCl | none | 1.17 g N as urea |
| E | 0.23 g N as urea | HE: 0.37 g K as KCl and 0.78 g K as KBC in formulation LE: 0.76 g K as KCl and 0.39 g K as KBC in formulation | none | 1.17 g N as urea |
| F | 0.23 g N as urea | 1.15 g K as KCl | none | 1.17 g N as urea |
| G | 0.23 g N as urea | 1.15 g K as KCl | none | 1.17 g N as urea |
| H | 0.23 g N as urea | HE: 0.37 g K as KCl and 0.78 g K as KBC in formulation LE: 0.76 g K as KCl and 0.39 g K as KBC in formulation | none | 1.17 g N as urea |

Note:
E3 was flooded at 3 leaf stage, all others were flooded at 4-leaf stage

TABLE 5

Formulations for Example 1 Tests

| Ingredient | A | *B | *C | D | E | F | G | H |
|---|---|---|---|---|---|---|---|---|
|  | Weight (g per 100 g of formulation) | | | | | | | |
| ABC | 0 | 27.3 | 27.3 | 0 | 0 | 0 | 0 | 0 |
| Urea | 0 | 10.5 | 10.5 | 0 | 0 | 0 | 0 | 0 |
| SBC | 0 | 58.8 | 58.8 | 0 | 0 | 50 | 50 | 0 |
| KBC | 0 | 0 | 0 | 0 | 50 | 0 | 0 | 50 |
| Brown Rice Seed grind | 0 | 0 | 1.15 | 100 | 50 | 50 | 25 | 25 |
| Corn Starch | 0 | 1.15 | 0 | 0 | 0 | 0 | 0 | 0 |
| PS | 0 | 0 | 0 | 0 | 0 | 0 | 25 | 25 |
| Stearic Acid | 0 | 1.15 | 1.15 | 0 | 0 | 0 | 0 | 0 |
| Magnesium Stearate | 0 | 1.15 | 1.15 | 0 | 0 | 0 | 0 | 0 |

*9.66% N

Each test was planted in triplicate. The tests were planted on May 30. On June 21, additional nutrients were given to all of the containers in equal amounts to adjust to the best growing conditions for rice based on soil test results.

At harvest, the rice was cut from the plants and the panicles were weighed. It was observed that a few containers had four plants instead of three plants. One container had only two plants. The results of the weighed panicles were averaged for only the containers that had three plants. These averages are reported in Tables 5-8 below are for the results of the buckets with three plants.

TABLE 6

Results for Tests When Formulation Was Placed at Planting of Seed (EP)

| Formulation Letter | Weight of Formulation Applied per Container (g) | Average Panicle Weight per Container (g) | % Difference in Yield from Baseline | Formulation Ingredients |
|---|---|---|---|---|
| A.N/A | none | 77.7 | 0.0% | Baseline-none |
| C.LE | 2.4 | 113.2 | 45.7% | ABC + Urea + SBC + BRSG + SA + MS |
| D.HE | 2.0 | 113.8 | 46.5% | BRSG |
| D.LE | 1.0 | 105.8 | 36.2% | BRSG |
| E.HE | 4.0 | 82.7 | 6.5% | 50% KBC + 50% BRSG |
| E.LE | 2.0 | 112.5 | 44.8% | 50% KBC + 50% BRSG |
| F.HE | 4.0 | 54.7 | −29.6% | 50% SBC + 50% BRSG |
| F.LE | 2.0 | 93.4 | 20.2% | 50% SBC + 50% BRSG |
| G.HE | 4.0 | 101.7 | 30.9% | 50% SBC + 25% BRSG + 25% PS |
| G.LE | 2.0 | 95.8 | 23.3% | 50% SBC + 25% BRSG + 25% PS |
| H.HE | 4.0 | 85.8 | 10.4% | 50% KBC + 25% BRSG + 25% PS |
| H.LE | 2.0 | 102.4 | 31.8% | 50% KBC + 25% BRSG + 25% PS |

TABLE 7

Results for Tests When Formulation Was Placed at Planting of Seed and Again Two Weeks Later (P2)

| Formulation Letter | Weight of Formulation Applied per Container (g) | Average Weight of Panicles per Container (g) | % Difference in Yield from Baseline | Formulation Ingredients |
|---|---|---|---|---|
| A.N/A | none | 94.1 | 0.0% | Baseline |
| C.N/A | 2.4 g at planting + 2.4 g 2 weeks later | 84.4 | −10.3% | ABC + Urea + SBC + BRSG + SA + MS |

TABLE 8

Results for Tests When Formulation Was Placed at the 3-Leaf Stage of the Plants (E3)

| Formulation Letter | Weight of Formulation Applied per Container (g) | Average Weight of Panicles per Container (g) | % Difference in Yield from Baseline | Formulation Ingredients |
|---|---|---|---|---|
| A.N/A | none | 84.1 | 0.0% | Baseline |
| B.N/A | 12.14 | 76.6 | −8.9% | ABC + Urea + SBC + CS + SA + MS |
| C.N/A | 12.14 | 99.7 | 18.5% | ABC + Urea + SBC + BRSG + SA + MS |

TABLE 9

Results for Tests When Formulation Was Placed at the 4-Leaf Stage of the Plants (E4)

| Label | Weight of Formulation Applied per Container (g) | Average Weight of Panicles per Container (g) | % Difference in Yield from Baseline | Formulation Ingredients |
|---|---|---|---|---|
| A | none | 77.7 | 0.0% | Baseline |
| B | 12.14 | 88.2 | 13.6% | ABC + Urea + SBC + CS + SA + MS |
| C | 12.14 | 97.3 | 25.3% | ABC + Urea + SBC + BRSG + SA + MS |

Example 1 demonstrates the following:
1. Applying a low level of ABC+Urea+SBC+BRSG+SA+ MS at planting gives more benefit than applying the formulation at the 4-leaf stage even at a much higher level of application.
   a. The increase in yield over the baseline was 46% when the formulation was applied at a rate of 328 kg/hectare (293 lbs./acre) at planting. This rate of application included the starter nitrogen as urea at 61 lbs./acre.
   b. When the formulation was applied at a the 4-leaf stage at a rate of 1,663 kg/hectare (1,484 lbs./acre) with 350 kg/hectare (312 lbs./acre) being urea, the increase in yield over the baseline was 25.3%.
2. There was no benefit to applying a second application of the full formulation ABC+urea+SBC+BRSG+SA+MS at 2 weeks. (P2 vs. EP for the C formulation)
3. Applying lower levels of KBC with rice seed grind as well as with rice seed grind and sugar at planting performs better than higher levels of KBC with rice seed grind as well as with rice seed grind and sugar at planting.
   a. Applying KBC with Rice seed grind at planting at a rate of 274 kg/hectare (244 lb./acre) provided an increase in yield over the baseline of 45%.
4. Applying rice seed grind at planting provided a benefit and increase in yield of up to 47%.

Example 2: Testing the Early Growth of Cotton

For Example 2, cotton was planted in 473 mL (16 ounce) clear cups using sieved topsoil from the local area and is labeled S-3 in the soil test results of Table 2. Each cup had 400 g of soil mixed with 0.125 g of single super phosphate. Each cup was given 0.2 g urea in 25 mL of solution. Since the potassium in the soil was elevated, the soil in the cups were not given any starter potassium. Two cotton seeds were planted in each cup 1 inch deep and 3 inches apart.

The cups holding the soil were transparent plastic and were placed inside opaque cups. The seeds were planted in the soil against the inside surface of the transparent cups and the outer opaque cups protected the roots from light during growth. By removing the inner cups, the roots were viewed and pictures taken without disturbing the plants as they were developing and therefore a view of the early growth of the roots was possible.

Before planting the cotton seeds, the seeds were weighed and selected to be between 0.0910 g and 0.1025 g in weight. After planting the seeds, the following mixtures were buried 1.27 cm (½ inch) deep in the center of each cup.

TABLE 10

Plant Growth Enhancer Formulations buried in Example 2

| Label | Formulation |
|---|---|
| A | 0.4 g SBC + 0.168 g PS |
| B | 0.4 g SBC + 0.168 g BRSG |
| C | 0.4 g KBC + 0.168 g PS |
| D | 0.4 g KBC + 0.168 g BRSG |
| BL | Baseline - none |

If two seeds sprouted in a cup, the second was immediately removed. After the plants grew for 31 days, they were gently removed from the cups, washed and dried. Table 11 shows the weight of the plant and roots as well as the weight of just the roots.

FIG. 1 is a photograph showing the cotton plants and roots for Example 2 after they were cleaned and dried. This photograph shows the dramatic differences in plants and roots for the plants grown using the invention as compared to the baseline plant. As can be seen by examining the photograph, the roots of the plants grown with the invention were benefited even more than upper part of the plants.

TABLE 11

Weights of Plants and Roots for Example 2

| Cup Label | Total Dry Weight of Plant + Roots (g) | Dry weight of roots only (g) | % Difference in Total Weight Compared to Baseline | % Difference in Root Weight Compared to Baseline |
|---|---|---|---|---|
| A | 0.0527 | 0.333 | 20.3% | 9.0% |
| B | 0.0809 | 0.3915 | 84.7% | 28.1% |
| C | 0.1157 | 0.4386 | 164.2% | 43.5% |
| D | | Cotton seeds did not sprout | | |
| BL | 0.0438 | 0.3056 | 0.0% | 0.0% |

Example 2 illustrates the following:
1. Using the combination of bicarbonate and rice seed grind or bicarbonate and powdered sugar dramatically increased the early growth of cotton plants and roots.
2. Potassium bicarbonate produced more benefit with early growth of cotton than sodium bicarbonate.

Example 3

For Example 3, corn was planted in 473 mL (16 ounce) clear cups using sieved topsoil from the local area and is labeled S-3 in the soil test results of Table 2. Each cup had 400 g of soil mixed with 0.125 g of single super phosphate. Each cup was given 0.2 g urea in 25 mL of solution. Two corn seeds were planted in each cup 1 inch deep and 3 inches apart.

The cups holding the soil were transparent plastic and were placed inside opaque cups. The seeds were planted in the soil against the inside surface of the transparent cups and the outer opaque cups protected the roots from light during growth. By removing the inner cups, the roots were viewed and pictures taken without disturbing the plants as they were developing and therefore a view of the early growth of the roots was possible.

Before planting the corn seeds, the seeds were weighed and selected to be between 0.3350 g and 0.3790 g in weight. After planting the seeds, the mixtures in Table 12 were buried 1.27 cm (½ inch) deep in the center of each cup. Some of these were buried on the same day as the seed was planted (noted as .P in Table 13), and others were buried 11 days after the seed was planted (noted as .L in Table 13).

TABLE 12

Plant Growth Enhancer Formulations buried in Example 3

| Label | Formulation |
|---|---|
| A | 0.40 g KBC |
| D | 0.40 g KBC + 0.168 g PS |
| E | 0.40 g KBC + 0.168 g BRSG |
| G | 0.40 g KBC + 0.084 g PS |
| H | 0.20 g KBC |
| L | 0.20 g KBC + 0.168 g PS |
| M | 0.20 g KBC + 0.168 g BRSG |
| N | 0.40 g KBC + 0.084 g BRSG |
| P | 0.168 g PS |
| R | 0.168 g BRSG |
| BL | Baseline - none |

If two seeds sprouted in a cup, the second was immediately removed. One cup for each formulation was tested. The baseline was tested in duplicate.

Twenty-four days after planting the corn, the plants with roots were gently removed from the cups, rinsed, dried, and weighed. The weights are given in Table 13. The % differences shown in Table 13 are compared to the baseline with the highest weight of total weight for the plant and roots.

TABLE 13

Dry Weights of Corn Seedlings for Example 3

| Label | Total Dry Weight of Plant + Roots (g) | Dry Weight of Roots (g) | % Difference from Baseline for Plant + Roots | % Difference from Baseline for Roots Only | Formulation |
|---|---|---|---|---|---|
| H.P | 0.5252 | 0.2744 | −20% | −16% | 0.20 g KBC |
| A.P | 0.5292 | 0.2313 | −20% | −29% | 0.40 g KBC |
| G.L | 0.5560 | 0.3127 | −16% | −4% | 0.40 g KBC + .084 g PS |
| H.L | 0.5597 | 0.2538 | −15% | −22% | .20 g KBC |
| BL.b | 0.5937 | 0.3116 | −10% | −5% | BASELINE |
| BL.a | 0.6602 | 0.3268 | 0% | 0% | BASELINE |
| L.L | 0.6725 | 0.3030 | 2% | −7% | 0.20 g KBC + 0.168 g PS |
| L.P | 0.6750 | 0.3645 | 2% | 12% | 0.20 g KBC + 0.168 g PS |
| P.L | 0.6825 | 0.3204 | 3% | −2% | 0.168 g PS |
| D.L | 0.6915 | 0.4096 | 5% | 25% | 0.40 g KBC + 0.168 g PS |
| P.P | 0.7119 | 0.3752 | 8% | 15% | 0.168 g PS |
| M.L | 0.7266 | 0.3411 | 10% | 4% | 0.20 g KBC + 0.168 g BRSG |
| D.P | 0.7493 | 0.3352 | 13% | 3% | 0.40 g KBC + 0.168 g PS |
| G.P | 0.7554 | 0.3707 | 14% | 13% | 0.40 g KBC + 0.084 g PS |
| A.L | 0.7818 | 0.4121 | 18% | 26% | 0.40 g KBC |
| R.L | 0.7885 | 0.3993 | 19% | 22% | 0.168 g BRSG |
| N.L | 0.8033 | 0.3957 | 22% | 21% | 0.40 g KBC + 0.084 g BRSG |
| E.P | 0.8234 | 0.4197 | 25% | 28% | 0.40 g KBC + 0.168 g BRSG |
| R.P | 0.8436 | 0.4200 | 28% | 29% | 0.168 g BRSG |
| N.P | 0.8960 | 0.4346 | 36% | 33% | 0.40 g KBC + 0.084 g BRSG |
| M.P | 0.9113 | 0.4515 | 38% | 38% | 0.20 g KBC + 0.168 g BRSG |

Example 3 illustrates the following:
1. KBC with a rice seed grind or powdered sugar applied at planting to corn provided a significant early improvement in plant and root growth. This is particularly true when the carbohydrate was brown rice seed grind instead of powdered sugar. The benefit was up to 38% increase in total plant and root weight.
2. Lowest level of applied KBC performed as well with the highest level of applied brown rice seed grind as the highest level of applied KBC did with the lowest level of applied brown rice seed grind. However, the highest level of applied brown rice seed grind alone without KBC did as well as the same level of applied brown rice seed grind with the highest level of applied KBC.
3. In general KBC alone did not provide a benefit to early growth of corn.
4. In general powdered sugar with KBC or alone showed some benefit but not as much as when brown rice seed grind is used in early growth of corn.
5. In general brown rice seed grind with KBC provides a significant benefit in early growth of corn when applied either at planting or at 2 weeks. However, the greatest benefit was seen when the KBC and rice seed grind were applied at planting.
6. A synergism between KBC and brown rice seed grind as well as between KBC and powdered sugar is seen in improving the early growth of corn. However, brown rice seed grind in particular is better than powdered sugar.

Example 4: Test Early Application of the Invention with Wheat

For Example 4, wheat was planted in 473 mL (16 ounce) clear cups using sieved topsoil from the local area and is labeled S-3 in the soil test results of Table 2. Each cup had 400 g of soil mixed with 0.125 g of single super phosphate. Each cup was given 0.2 g urea in 25 mL of solution. Four wheat seeds were planted in each cup 1 inch deep and 3 inches apart.

The cups holding the soil were transparent plastic and were placed inside opaque cups. The seeds were planted in the soil against the inside surface of the transparent cups and the outer opaque cups protected the roots from light during growth. By removing the inner cups, the roots were viewed and pictures taken without disturbing the plants as they were developing and therefore a view of the early growth of the roots was possible.

Before planting the wheat seeds, the seeds were weighed and selected to be between 0.0371 g and 0.0434 g in weight. After planting the seeds, the mixtures in Table 12 were buried 1.27 cm (½ inch) deep in the center of each cup. Some of these were buried on the same day as the seeds were planted (noted as .P in Table 14), and others were buried 11 days after the seed was planted (noted as .L in Table 14).

If more than two seeds sprouted in a cup, the seedlings were removed to allow only two to remain. One of each formulation was tested. The baseline was tested in duplicate.

Twenty-eight days after planting the wheat, the plants with roots were gently removed from the cups, rinsed, dried, and weighed. The weights are given in Table 14. The % differences shown in Table 14 are compared to the baseline with the highest weight of total plant and roots.

TABLE 14

Dry Weights of Wheat Seedlings for Example 4

| Cup Label | Dry Weight of Total Plant + Root (g) | Dry Weight of Root Only (g) | % Difference for Plant + Roots | % Difference for Roots Only | Formulations |
| --- | --- | --- | --- | --- | --- |
| L.P | 0.1580 | 0.0483 | −38% | −61% | 0.2 g KBC + 0.168 g PS |
| E.P | 0.1733 | 0.0663 | −32% | −47% | 0.4 g KBC + 0.168 g BRSG |
| R.L | 0.1800 | 0.0598 | −29% | −52% | 0.168 g BRSG |
| BL-a | 0.2300 | 0.0706 | −10% | −43% | BASELINE |
| A.P | 0.2337 | 0.0669 | −8% | −46% | 0.4 g KBC |
| M.L | 0.2359 | 0.0858 | −7% | −31% | 0.2 g KBC + 0.168 g BRSG |
| D.L | 0.2403 | 0.0985 | −6% | −21% | 0.4 g KBC + 0.168 g PS |
| E.L | 0.2451 | 0.1100 | −4% | −12% | 0.4 g KBC + 0.168 g BRSG |
| BL-b | 0.2544 | 0.1246 | 0% | 0% | BASELINE |
| R.P | 0.2606 | 0.1259 | 2% | 1% | 0.168 g BRSG |
| A.L | 0.2670 | 0.1166 | 5% | −6% | 0.4 g KBC |
| N.L | 0.2783 | 0.0996 | 9% | −20% | 0.4 g KBC + 0.084 g BRSG |
| L.L | 0.2800 | 0.1374 | 10% | 10% | 0.2 KBC + 0.168 g PS |
| H.L | 0.2881 | 0.1286 | 13% | 3% | 0.2 KBC |
| G.L | 0.3018 | 0.1209 | 19% | −3% | 0.4 g KBC + 0.084 g PS |
| H.P | 0.3030 | 0.1334 | 19% | 7% | 0.2 g KBC |
| M.P | 0.3073 | 0.1225 | 21% | −2% | 0.2 g KBC + 0.168 g BRSG |
| G.P | 0.3114 | 0.1135 | 22% | −9% | 0.4 g KBC + 0.084 g PS |
| D.P | 0.3210 | 0.1512 | 26% | 21% | 0.4 g KBC + 0.168 g PS |
| N.P | 0.3256 | 0.1606 | 28% | 29% | 0.4 g KBC + 0.084 g BRSG |

This Example illustrates the following:

KBC with brown rice seed grind or powdered sugar applied at planting to wheat provided a significant early improvement in plant and root growth. This is particularly true when the carbohydrate was brown rice seed grind instead of powdered sugar. The benefit was up to 28% increase in total plant and root weight.

While only a few exemplary embodiments of this invention have been described in detail, those skilled in the art will recognize that there are many possible variations and modifications which can be made in the exemplary embodiments while yet retaining many of the novel and advantageous features of this invention. Accordingly, it is intended that the following claims cover all such modifications and variations.

The invention claimed is:

1. A fertilizer for providing enhanced seedling growth comprising:
   a seed grind comprising ground seed;
   urea;
   ammonium bicarbonate, and
   an alkali bicarbonate comprising at least one of sodium bicarbonate or potassium bicarbonate, wherein the seed grind increases available seed components required for a seedling to grow to enhance the seedling growth.

2. The fertilizer according to claim 1, comprising 1 wt. % to 97 wt. % of the seed grind, 1 wt. % to 77 wt. % of the ammonium bicarbonate, 1 wt. % to 77 wt. % of the alkali bicarbonate, and 1 wt. % to 90 wt. % of the urea.

3. The fertilizer according to claim 1, comprising 10 wt. % to 78 wt. % of the seed grind, 10 wt. % to 77 wt. % of the ammonium bicarbonate, 10 wt. % to 77 wt. % of the alkali bicarbonate, and 2 wt. % to 70 wt. % of the urea.

4. The fertilizer according to claim 1, comprising 15 wt. % to 60 wt. % of the seed grind, 15 wt. % to 60 wt. % of the ammonium bicarbonate, 15 wt. % to 60 wt. % of the alkali bicarbonate, and 10 wt. % to 60 wt. % of urea.

5. The fertilizer according to claim 1, wherein the seed grind comprises the whole seed.

6. The fertilizer according to claim 1, wherein the ground seed comprises rice.

7. The fertilizer according to claim 1, wherein the ground seed is selected from the group consisting of cotton, soybean, rice, wheat, corn, and sugar beet.

8. The fertilizer according to claim 1, wherein the seed grind is not fit for human consumption and further comprises at least one of additional plant parts, dirt, contaminants, molds, fungi, dispersing agents, parting agents, binders, bacteria, herbicides, pesticides, fungicides, stabilizers, or additives.

9. The fertilizer according to claim 1, further comprising a source of sugar.

10. The fertilizer according to claim 9, wherein the source of sugar is selected from the group consisting of sucrose, fructose, galactose, glucose, lactose, maltose, xylose, powdered sugar, corn syrup, cane syrup, agave, sorghum, honey, sugar cane, sugar beets, fruits, vegetables, and compounds that form or release sugar in soil or water.

11. The fertilizer according to claim 9, comprising 0.2% to 97% of the source of sugar.

12. The fertilizer according to claim 9, comprising 1 wt. % to 96 wt. % of the seed grind, 1 wt. % to 77 wt. % of the ammonium bicarbonate, 1 wt. % to 77 wt. % of the alkali bicarbonate, 1 wt. % to 77 wt. % of the source of sugar, and 1 wt. % to 90 wt. % of the urea.

13. The fertilizer according to claim 9, comprising 10 wt. % to 76 wt. % of the seed grind, 10 wt. % to 76 wt. % of the ammonium bicarbonate, 10 wt. % to 76 wt. % of the alkali bicarbonate, 2 wt. % to 68 wt. % of the source of sugar, and 2 wt. % to 68 wt. % of the urea.

14. The fertilizer according to claim 9, comprising 20 wt. % to 60 wt. % of the seed grind, 15 wt. % to 55 wt. % of the ammonium bicarbonate, 15 wt. % to 55 wt. % of the alkali bicarbonate, 5 wt. % to 45 wt. % of the source of sugar, and 5 wt. % to 45 wt. % of the urea.

15. The fertilizer according to claim 1, wherein the fertilizer is in a form of granules or tablets.

16. The fertilizer of claim 1 further comprising a source of carbohydrate.

\* \* \* \* \*